United States Patent
Nam et al.

(10) Patent No.: US 11,665,747 B2
(45) Date of Patent: May 30, 2023

(54) RANDOM ACCESS CONFIGURATIONS USING REFERENCE SIGNALS

(71) Applicant: QUALCOMM Incorporated, San Diego, CA (US)

(72) Inventors: Wooseok Nam, San Diego, CA (US); Tao Luo, San Diego, CA (US); Peter Gaal, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/304,779

(22) Filed: Jun. 25, 2021

(65) Prior Publication Data

US 2021/0410197 A1 Dec. 30, 2021

Related U.S. Application Data

(60) Provisional application No. 63/044,759, filed on Jun. 26, 2020, provisional application No. 63/044,761, filed on Jun. 26, 2020.

(51) Int. Cl.
*H04W 74/08* (2009.01)
*H04W 52/24* (2009.01)
(Continued)

(52) U.S. Cl.
CPC ....... *H04W 74/0841* (2013.01); *H04W 24/10* (2013.01); *H04W 52/146* (2013.01);
(Continued)

(58) Field of Classification Search
CPC ......... H04W 74/0833; H04W 74/0841; H04W 74/008; H04W 74/0891; H04W 24/10;
(Continued)

(56) References Cited

U.S. PATENT DOCUMENTS

2018/0324853 A1* 11/2018 Jeon ...................... H04W 52/04
2019/0053171 A1* 2/2019 Jung ................. H04W 72/0473
(Continued)

OTHER PUBLICATIONS

ETSI Technical Specification 38.331, version 16.0.0, Release 16, "3rd Generation Partnership Project; Technical Specification Group Radio Access Network; NR; Radio Resource Control (RRC) protocol specification," Mar. 2021, pp. 1-832.
(Continued)

*Primary Examiner* — Ricardo H Castaneyra
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station and while in a low-power mode, a reference signal, where the reference signal is not a cell-specific reference signal. Additionally, or alternatively, the UE may receive a signal including at least one parameter associated with the reference signal. Accordingly, the UE may initiate, with the base station, a random access procedure based at least in part on measurements of the reference signal. In some aspects, the UE may initiate the random access procedure by transmitting, to the base station, a random access preamble based at least in part on the at least one parameter. Numerous other aspects are provided.

30 Claims, 13 Drawing Sheets

(51) Int. Cl.
*H04W 24/10* (2009.01)
*H04W 74/00* (2009.01)
*H04W 52/14* (2009.01)

(52) U.S. Cl.
CPC ....... *H04W 52/242* (2013.01); *H04W 74/008* (2013.01); *H04W 74/0833* (2013.01); *H04W 74/0891* (2013.01)

(58) Field of Classification Search
CPC . H04W 24/08; H04W 52/242; H04W 52/362; H04W 52/50; H04W 52/146
See application file for complete search history.

(56) References Cited

U.S. PATENT DOCUMENTS

| | | | | |
|---|---|---|---|---|
| 2019/0053313 | A1* | 2/2019 | Zhou | H04W 52/42 |
| 2019/0268882 | A1* | 8/2019 | Baghel | H04W 74/0833 |
| 2020/0053779 | A1* | 2/2020 | Jeon | H04B 7/0695 |
| 2020/0367234 | A1* | 11/2020 | Bergström | H04L 5/0005 |
| 2021/0176670 | A1* | 6/2021 | Keskitalo | H04W 36/0011 |
| 2021/0321461 | A1* | 10/2021 | Kung | H04W 76/18 |
| 2022/0095136 | A1* | 3/2022 | Beale | H04L 1/0035 |

OTHER PUBLICATIONS

3GPP TS 38.213: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis, Cedex, France, vol. RAN WG1, No. V16.0.0, Dec. 2019, Jan. 14, 2020 (Jan. 14, 2020), XP051860806, pp. 1-146, Retrieved from the Internet: URL: http://ftp.3gpp.org/Specs/archive/38_series/38.213/38213-g00.zip 38213-g00.docx [retrieved on Jan. 14, 2020], section 7.6.2, Section 10, Section 10.1, p. 100, Section 10.3, Paragraph [09.1], clause 7.2.1, p. 23-p. 25, clause 9, p. 49, paragraph 3 clause 9.1, p. 49, paragraph 4-paragraph 15 clause 9.1.1, p. 50, paragraph 5-paragraph 6 clause 9.1.2.1, p. 55 clause 9.1.3, p. 57, paragraph 8 clause 9.1.3.1, p. 61, paragraph 1-paragraph 2 clause 9.1.3.2, p. 63, paragraph 6, clause 9.1.3.3, p. 64, paragraph 1-p. 65, paragraph 10, p. 56. paragraph 6-p. 57, paragraph 1 ch, 9.2.3, p. 73, paragraph 5, p. 44, paragraph 8, p. 10, paragraph 1, p. 105-p. 106, tables 10.2-1. 10.2-2, paragraph [9.2.5].

* cited by examiner

RANDOM ACCESS CONFIGURATIONS USING REFERENCE SIGNALS

CROSS-REFERENCE TO RELATED APPLICATIONS

This patent application claims priority to U.S. Provisional Patent Application No. 63/044,759, filed on Jun. 26, 2020, entitled "RANDOM ACCESS CONFIGURATIONS USING REFERENCE SIGNALS," and assigned to the assignee hereof, and to U.S. Provisional Patent Application No. 63/044,761, filed on Jun. 26, 2020, entitled "TRANSMIT POWER FOR RANDOM ACCESS PREAMBLES," and assigned to the assignee hereof. The disclosures of the prior applications are considered part of and are incorporated by reference in this patent application.

FIELD OF THE DISCLOSURE

Aspects of the present disclosure generally relate to wireless communication and to techniques and apparatuses for performing random access procedures using reference signals and for determining transmit power for random access preambles.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, while the UE is in a low-power mode, a reference signal from a base station, wherein the reference signal is not a cell-specific reference signal; and initiating, with the base station, a random access procedure based at least in part on measurements of the reference signal.

In some aspects, a method of wireless communication performed by a base station includes transmitting, to a UE, a broadcast message including at least one parameter associated with a random access procedure; and transmitting, to the UE, a reference signal for the UE to measure, wherein the random access procedure is based at least in part on measurements of the reference signal.

In some aspects, a non-transitory computer-readable medium storing a set of instructions for wireless communication includes one or more instructions that, when executed by one or more processors of a UE, cause the UE to receive, while the UE is in a low-power mode, a reference signal from a base station, wherein the reference signal is not a cell-specific reference signal; and initiate, with the base station, a random access procedure based at least in part on measurements of the reference signal.

In some aspects, a non-transitory computer-readable medium storing a set of instructions for wireless communication includes one or more instructions that, when executed by one or more processors of a base station, cause the base station to transmit, to a UE, a broadcast message including at least one parameter associated with a random access procedure; and transmit, to the UE, a reference signal for the UE to measure, wherein the random access procedure is based at least in part on measurements of the reference signal.

In some aspects, a UE for wireless communication includes a memory and one or more processors coupled to the memory, the one or more processors configured to receive, while the UE is in a low-power mode, a reference signal from a base station, wherein the reference signal is not a cell-specific reference signal; and initiate, with the base station, a random access procedure based at least in part on measurements of the reference signal.

In some aspects, a base station for wireless communication includes a memory; and one or more processors coupled to the memory, the one or more processors configured to transmit, to a UE, a broadcast message including at least one parameter associated with a random access procedure; and transmit, to the UE, a reference signal for the UE to measure, wherein the random access procedure is based at least in part on measurements of the reference signal.

In some aspects, an apparatus for wireless communication includes means for receiving, while the apparatus is in a low-power mode, a reference signal from a base station, wherein the reference signal is not a cell-specific reference signal; and means for initiating, with the base station, a random access procedure based at least in part on measurements of the reference signal.

In some aspects, an apparatus for wireless communication includes means for transmitting, to a UE, a broadcast message including at least one parameter associated with a random access procedure; and means for transmitting, to the UE, a reference signal for the UE to measure, wherein the random access procedure is based at least in part on measurements of the reference signal.

In some aspects, a method of wireless communication performed by a UE includes receiving, from a base station, a signal including at least one parameter associated with a reference signal, wherein the reference signal is not a cell-specific reference signal; and transmitting, to the base station and based at least in part on measurements of the reference signal, a random access preamble with a transmit power based at least in part on the at least one parameter.

In some aspects, a method of wireless communication performed by a base station includes transmitting, to a UE, a signal including at least one parameter associated with a reference signal, wherein the reference signal is not a cell-specific reference signal; and receiving, from the UE and based at least in part on measurements of the reference signal, a random access preamble with a transmit power based at least in part on the at least one parameter.

In some aspects, a non-transitory computer-readable medium storing a set of instructions for wireless communication includes one or more instructions that, when executed by one or more processors of a UE, cause the UE to receive, from a base station, a signal including at least one parameter associated with a reference signal, wherein the reference signal is not a cell-specific reference signal; and transmit, to the base station and based at least in part on measurements of the reference signal, a random access preamble with a transmit power based at least in part on the at least one parameter.

In some aspects, a non-transitory computer-readable medium storing a set of instructions for wireless communication includes one or more instructions that, when executed by one or more processors of a base station, cause the base station to transmit, to a UE, a signal including at least one parameter associated with a reference signal, wherein the reference signal is not a cell-specific reference signal; and receive, from the UE and based at least in part on measurements of the reference signal, a random access preamble with a transmit power based at least in part on the at least one parameter.

In some aspects, a UE for wireless communication includes a memory and one or more processors coupled to the memory, the one or more processors configured to receive, from a base station, a signal including at least one parameter associated with a reference signal, wherein the reference signal is not a cell-specific reference signal; and transmit, to the base station and based at least in part on measurements of the reference signal, a random access preamble with a transmit power based at least in part on the at least one parameter.

In some aspects, a base station for wireless communication includes a memory and one or more processors coupled to the memory, the one or more processors configured to transmit, to a UE, a signal including at least one parameter associated with a reference signal, wherein the reference signal is not a cell-specific reference signal; and receive, from the UE and based at least in part on measurements of the reference signal, a random access preamble with a transmit power based at least in part on the at least one parameter.

In some aspects, an apparatus for wireless communication includes means for receiving, from a base station, a signal including at least one parameter associated with a reference signal, wherein the reference signal is not a cell-specific reference signal; and means for transmitting, to the base station and based at least in part on measurements of the reference signal, a random access preamble with a transmit power based at least in part on the at least one parameter.

In some aspects, an apparatus for wireless communication includes means for transmitting, to a UE, a signal including at least one parameter associated with a reference signal, wherein the reference signal is not a cell-specific reference signal; and means for receiving, from the UE and based at least in part on measurements of the reference signal, a random access preamble with a transmit power based at least in part on the at least one parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
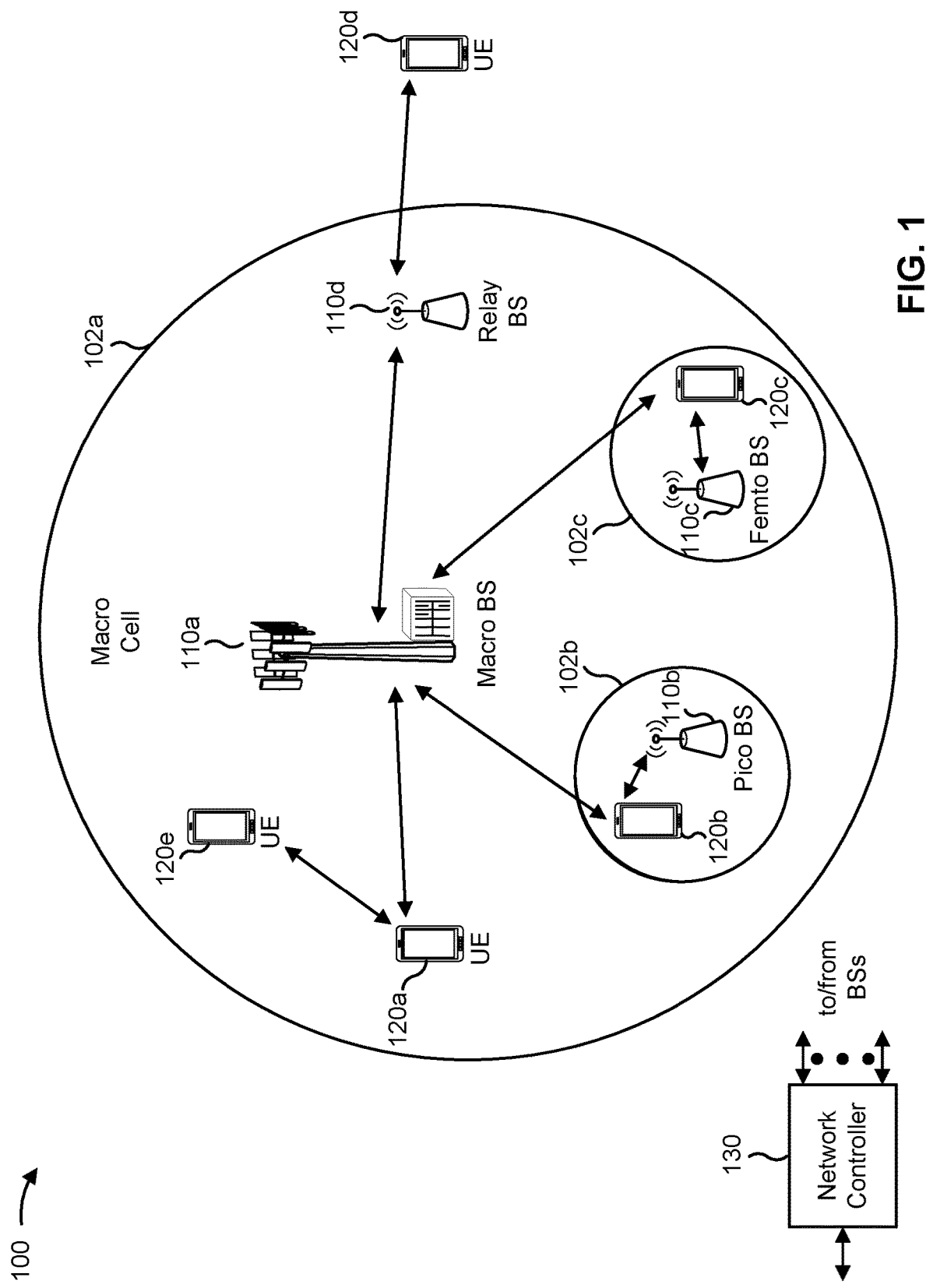
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
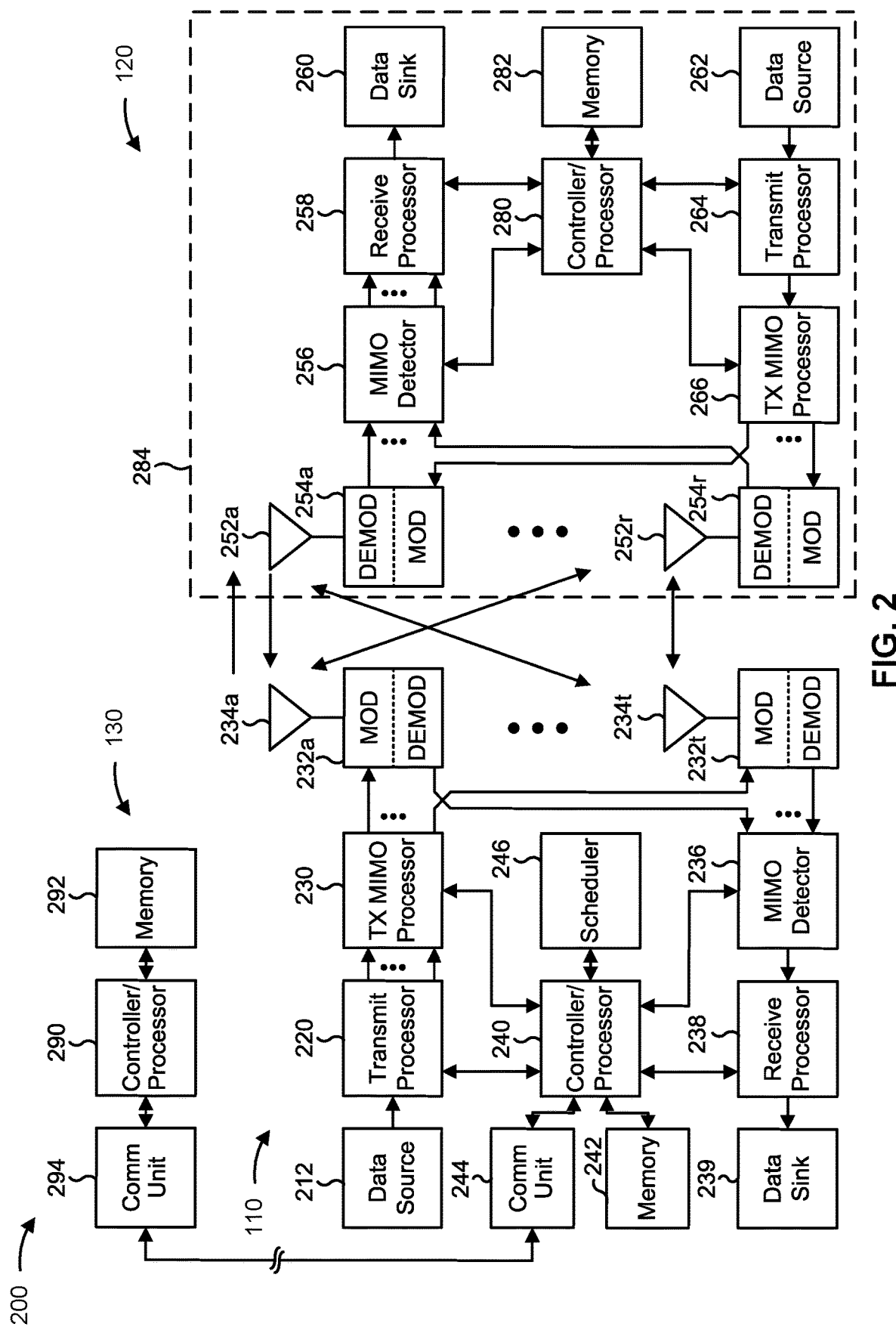
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with performing random access procedures using reference signals and/or determining transmit power for random access preambles, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) may include means for receiving, from a base station, a signal including at least one parameter associated with a reference signal, wherein the reference signal is not a cell-specific reference signal; and/or means for transmitting, to the base station, a random access preamble based at least in part on the at least one parameter. The means for the user equipment (UE) to perform operations described herein may include, for example, one or more of antenna 252, modem 254, MIMO detector 256, receive processor 258, transmit processor 264, TX MIMO processor 266, controller/processor 280, or memory 282.

Additionally, or alternatively, the UE may include means for receiving, while the UE is in a low-power mode, a reference signal from a base station, wherein the reference signal is not a cell-specific reference signal; and/or means for initiating, with the base station, a random access procedure based at least in part on measurements of the reference signal. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., the base station 110) may include means for transmitting, to a UE, a signal including at least one parameter associated with a reference signal, wherein the reference signal is not a cell-specific reference signal; and/or means for receiving, from the UE, a random access preamble based at least in part on the at least one parameter. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

Additionally, or alternatively, the base station may include means for transmitting, to a UE, a broadcast message including at least one parameter associated with a random access procedure; and/or means for transmitting, to the UE, a reference signal for the UE to measure, wherein the random access procedure is based at least in part on measurements of the reference signal. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
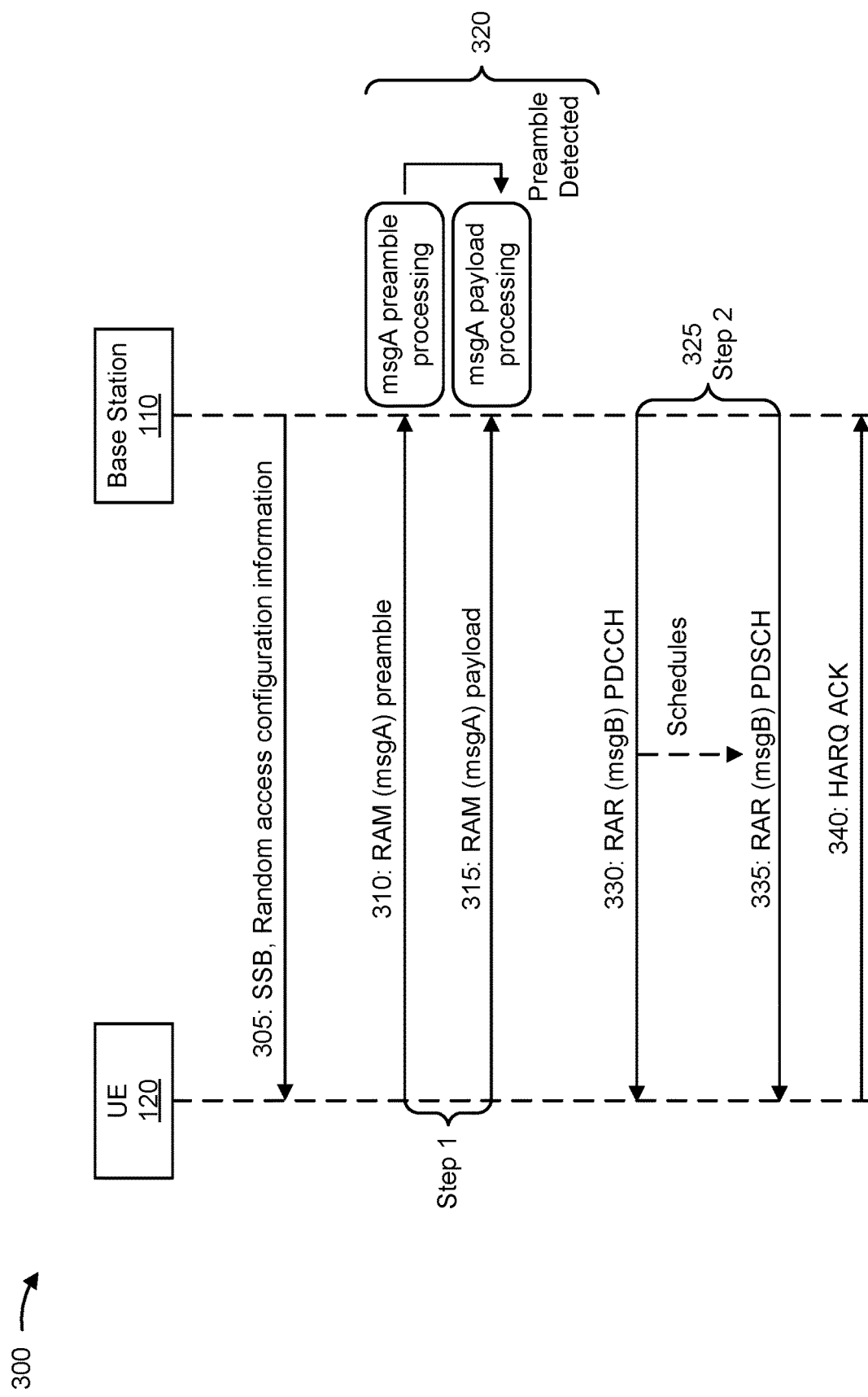
FIG. 3 is a diagram illustrating an example of a 2-step random access procedure, in accordance with the present disclosure.

FIG. 3 is a diagram illustrating an example 300 of a 2-step random access procedure, in accordance with the present disclosure. As shown in FIG. 3, a base station 110 and a UE 120 may communicate with one another to perform the 2-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the 2-step random access procedure, such as one or more parameters for transmitting a random access message (RAM) and/or receiving a random access response (RAR) to the RAM.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the 2-step random access procedure. In some aspects, the RAM may be referred to as message A, msgA, a first message, or an initial message in a 2-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a 4-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the 2-step random access procedure. In some aspects, the RAR message may be referred to as message B, msgB, or a second message in a 2-step random access procedure. The RAR message may include some or all of the contents of message 2 (msg2) and message 4 (msg4) of a 4-step random access procedure. For example, the RAR message may include the detected PRACH preamble identifier, the detected UE identifier, a timing advance value, and/or contention resolution information.

As shown by reference number 330, as part of the second step of the 2-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the 2-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARD) acknowledgement (ACK).

As indicated above, FIG. 3 is provided as an example. Other examples may differ from what is described with regard to FIG. 3.

Figure 4:
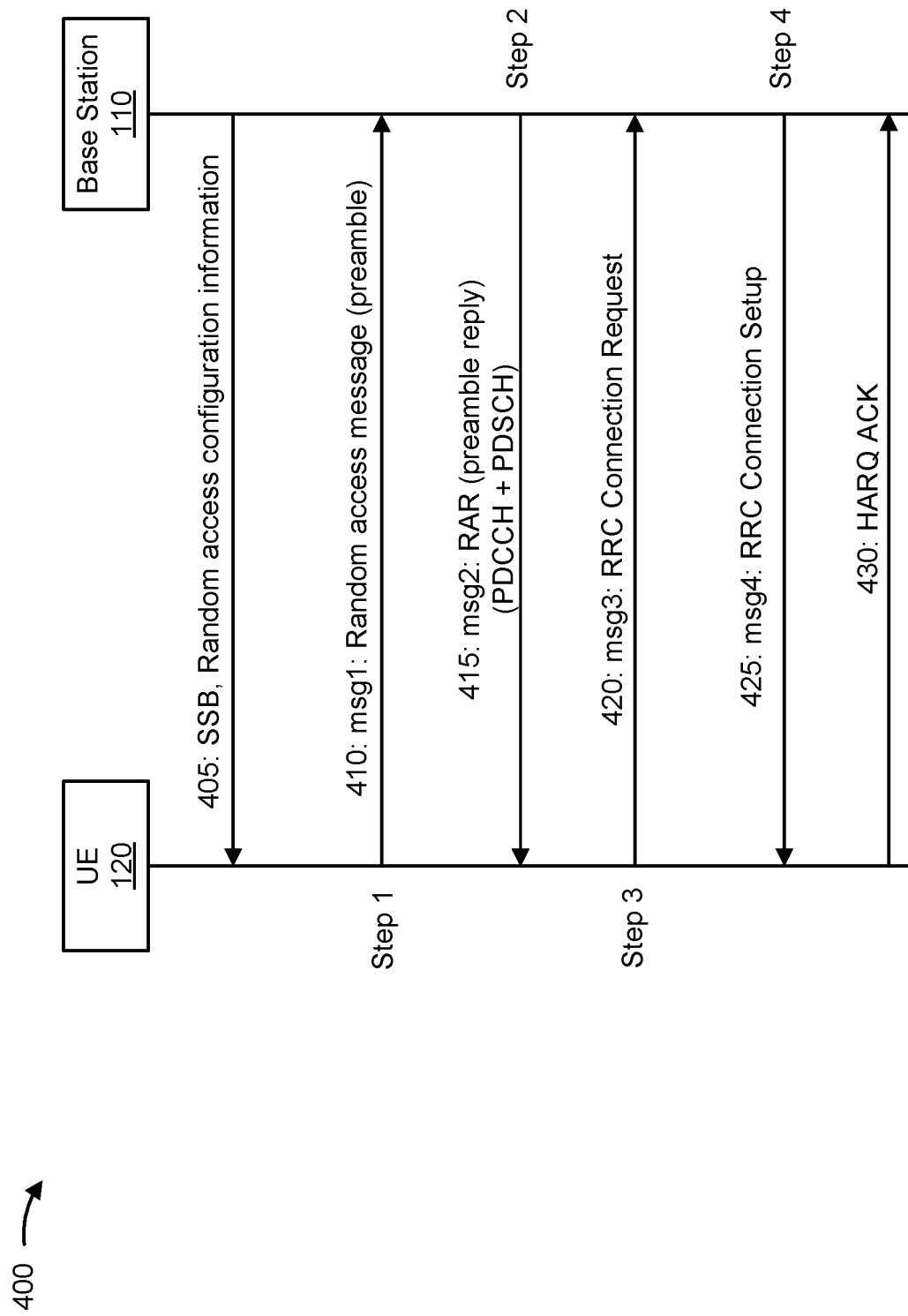
FIG. 4 is a diagram illustrating an example of a 4-step random access procedure, in accordance with the present disclosure.

FIG. 4 is a diagram illustrating an example 400 of a 4-step random access procedure, in accordance with the present disclosure. As shown in FIG. 4, a base station 110 and a UE 120 may communicate with one another to perform the 4-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 410, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a 4-step random access procedure. The random access message may include a random access preamble identifier.

As shown by reference number 415, the base station 110 may transmit an RAR as a reply to the preamble. The message that includes the RAR may be referred to as message 2, msg2, MSG2, or a second message in a 4-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the 4-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the 4-step random access procedure, the base station 110 may transmit the PDSCH communication for the RAR, as scheduled by the PDCCH communication. The RAR may be included in a MAC PDU of the PDSCH communication.

As shown by reference number 420, the UE 120 may transmit an RRC connection request message. The RRC connection request message may be referred to as message 3, msg3, MSG3, or a third message of a 4-step random access procedure. In some aspects, the RRC connection request may include a UE identifier, UCI, and/or a PUSCH communication (e.g., an RRC connection request).

As shown by reference number 425, the base station 110 may transmit an RRC connection setup message. The RRC connection setup message may be referred to as message 4, msg4, MSG4, or a fourth message of a 4-step random access procedure. In some aspects, the RRC connection setup message may include the detected UE identifier, a timing advance value, and/or contention resolution information. As shown by reference number 430, if the UE 120 successfully receives the RRC connection setup message, the UE 120 may transmit a HARQ ACK.

As indicated above, FIG. 4 is provided as an example. Other examples may differ from what is described with regard to FIG. 4.

Figure 5:
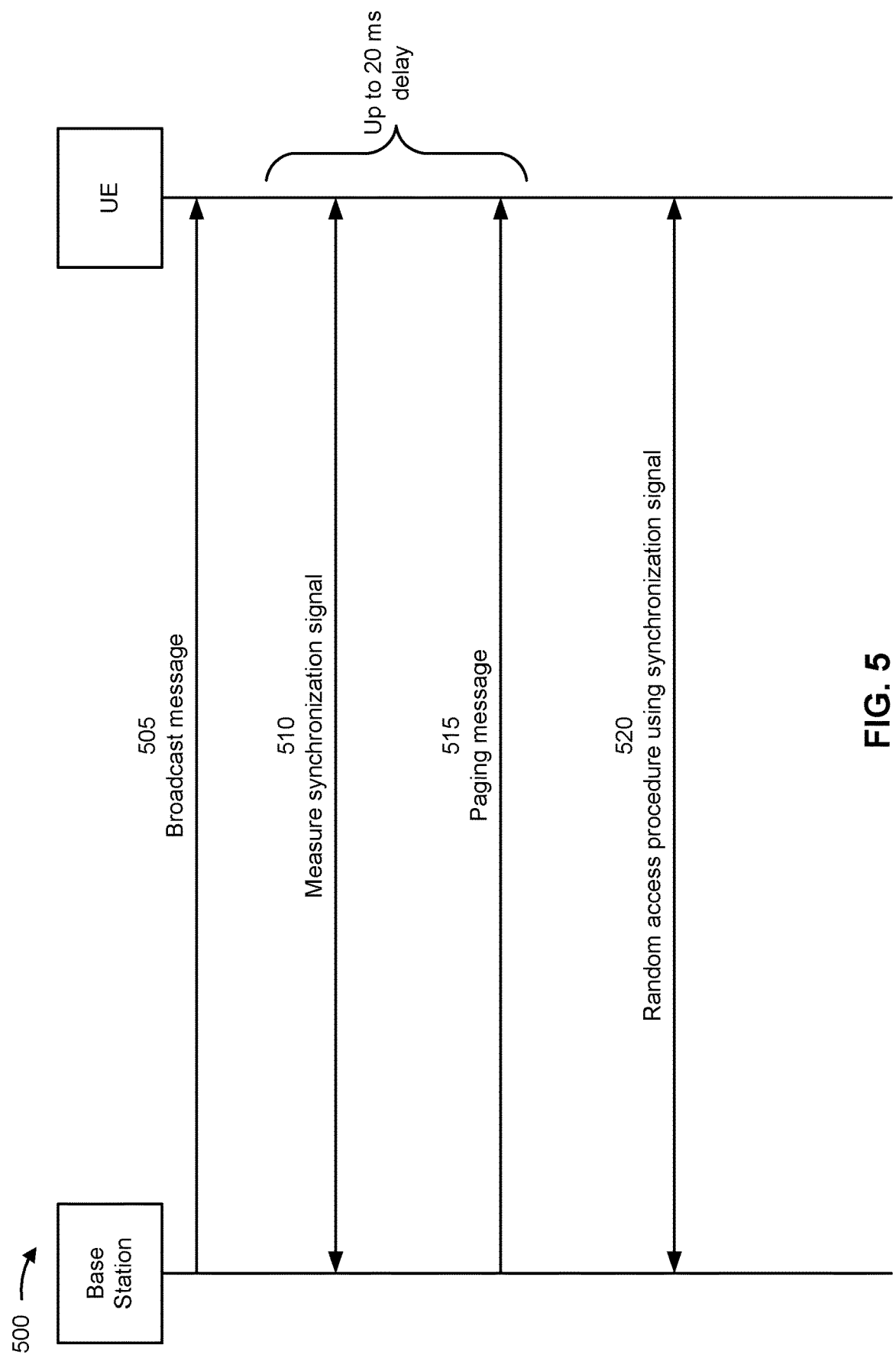
FIG. 5 is a diagram illustrating an example of initiating a random access procedure using a synchronization signal, in accordance with the present disclosure.

FIG. 5 is a diagram illustrating an example 500 of initiating a random access procedure using a synchronization signal, in accordance with the present disclosure. As shown in FIG. 5, a base station may communicate with a UE. The UE, for example, may receive network service in a cell including the base station.

As shown in connection with reference number 505, the UE may receive a message from the base station. For example, the message may include a broadcast message and/or periodic message, such as a SIB message. In some aspects, the SIB may include one or more parameters that the UE may use to establish a RACH with the base station (e.g., using a 2-step random access procedure as described above in connection with FIG. 3 and/or a 4-step random access procedure as described above in connection with FIG. 4). For example, the SIB may include a threshold associated with a synchronization signal (e.g., an SSB) such that the UE determines to use a random access occasion associated with the synchronization signal when the threshold is satisfied.

As shown in connection with reference number 510, the UE may measure the synchronization signal from the base station. However, many synchronization signals, such as SSBs, are transmitted with relatively low frequencies, such as 20 milliseconds (ms) periodicity or longer. Moreover, the UE will need to exit a low-power mode in order to measure the synchronization signal. As used herein, a "low-power mode" may refer to a mode of operation associated with an RRC idle mode or an RRC inactive state, in contrast to an RRC connected mode. Accordingly, the UE wastes power and suffers decreased battery efficiency because the UE is outside the low-power mode for up to 20 ms between measuring the synchronization signal and monitoring the paging occasion, as described below.

As shown in connection with reference number 515, the UE may receive a paging message in a paging occasion. For example, the UE may receive a PDCCH message. In some aspects, the PDCCH message may include DCI with a cyclic redundancy check (CRC) scrambled by a radio network temporary identifier (RNTI) associated with a group of UEs including the UE, such as a paging RNTI (P-RNTI).

Additionally, the UE may receive a PDSCH message. The PDSCH message may include an international mobile subscriber identifier (IMSI) and/or another unique (or at least quasi-unique) identifier. As used herein, "quasi-unique" may refer to a portion of information that is not globally unique to the UE but can be used to identify the UE uniquely within a specific context (e.g., within a network cell and/or with a geographic range) and/or in combination with one or more additional quasi-unique portions of information. Accordingly, the UE may decode the PDSCH message to determine whether the base station is trying to page the UE. When the identifier included in the PDSCH message does not correspond to an identifier associated with the UE, the UE may return to the low-power mode (e.g., not executing operations described below in connection with reference number 520). When the identifier included in the PDSCH message does correspond to an identifier associated with the UE, the UE may establish a connection with the base station (e.g., by executing operations described below in connection with reference number 520).

Because the synchronization symbol has 20 ms periodicity or longer, the UE remains outside of the low-power mode for up to 20 ms between measuring the synchronization signal and monitoring for the paging message in the paging occasion, as shown in FIG. 5. Accordingly, as described above, the UE wastes power and suffers decreased battery efficiency.

As shown in connection with reference number 520, the UE may reestablish an RRC connection with the base station (e.g., using a random access procedure). For example, the UE may initiate, with the base station, a random access procedure, such as a 2-step random access procedure, as described above in connection with FIG. 3, and/or a 4-step random access procedure, as described above in connection with FIG. 4. In some aspects, the UE may initiate the random access procedure by transmitting, to the base station, a random access preamble.

In some aspects, the UE may initiate the random access procedure based on the measurement described above in connection with reference number 510 satisfying a threshold (e.g., a threshold included in the message described above in connection with reference number 505). For example, the UE may initiate the random access procedure in a random access occasion associated with the synchronization signal when the measurement of the synchronization signal satisfies the threshold. The UE may search for an alternate synchronization signal associated with a different random access occasion when the measurement of the synchronization signal does not satisfy the threshold.

As indicated above, FIG. 5 is provided as an example. Other examples may differ from what is described with respect to FIG. 5.

Figure 6:
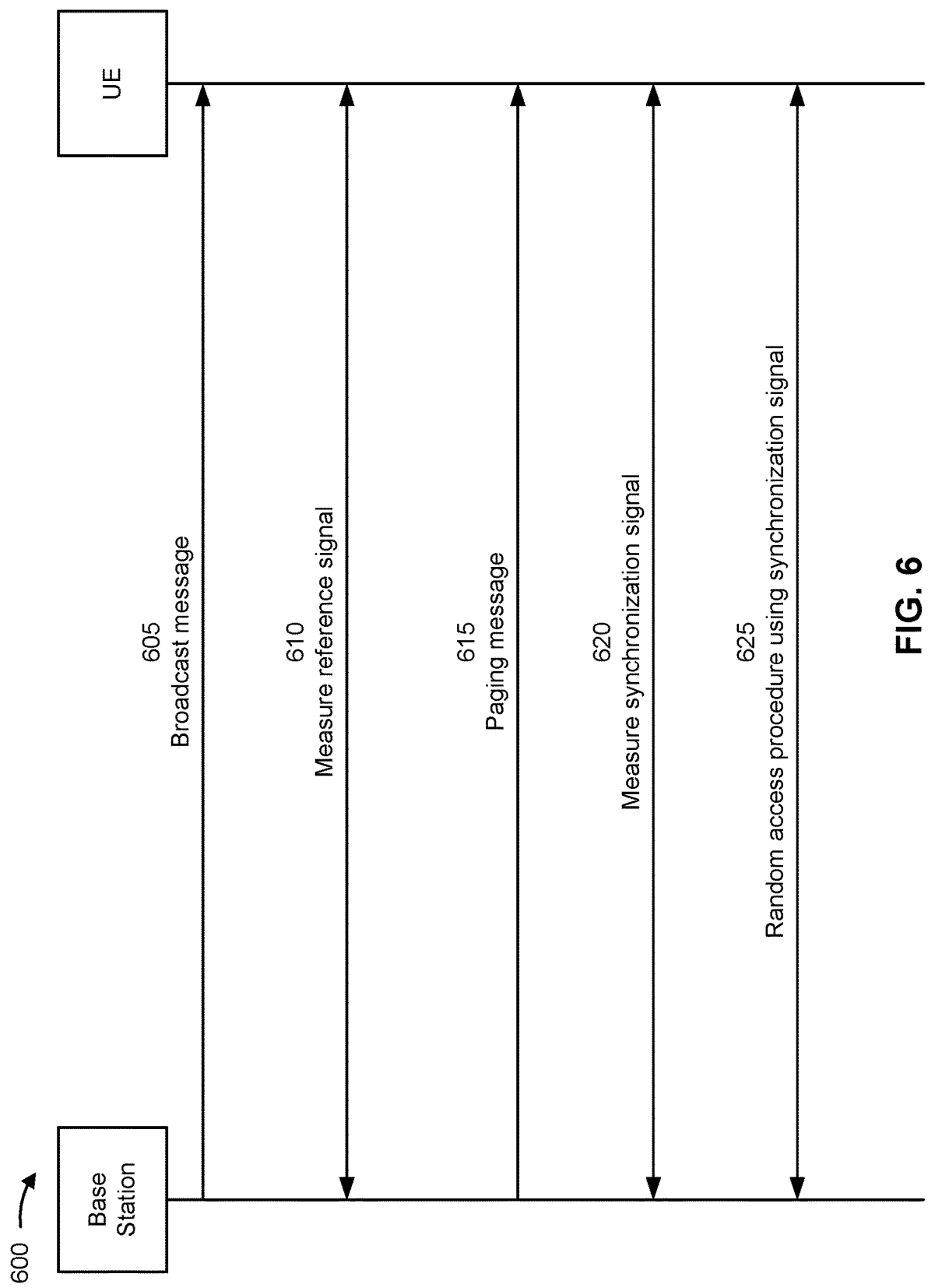
FIG. 6 is a diagram illustrating an example of initiating a random access procedure using a combination of a reference signal and a synchronization signal, in accordance with the present disclosure.

FIG. 6 is a diagram illustrating an example 600 of initiating a random access procedure using a combination of a reference signal and a synchronization signal, in accordance with the present disclosure. As shown in FIG. 6, a base station may communicate with a UE. The UE, for example, may receive network service in a cell including the base station.

As shown in connection with reference number 605, the UE may receive a message from the base station. For example, as described above in connection with reference number 505 of FIG. 5, the message may include a broadcast message and/or periodic message, such as a SIB message. In some aspects, the SIB message may include one or more parameters that the UE may use to establish a RACH with the base station (e.g., using a 2-step random access procedure as described above in connection with FIG. 3 and/or a 4-step random access procedure as described above in connection with FIG. 4). For example, the SIB may include a threshold associated with a synchronization signal (e.g., an SSB) such that the UE determines to use a random access occasion associated with the synchronization signal when the threshold is satisfied.

As shown in connection with reference number 610, the UE may measure a reference signal from the base station. For example, the reference signal may include a TRS, a CSI-RS, and/or another reference signal. Many reference signals, including TRS and CSI-RS, are generally transmitted with higher frequencies than the synchronization signal, such as 5 ms periodicity or shorter. The UE may exit a low-power mode to measure the reference signal (but may remain in an idle mode and/or an inactive state). However, because the UE is outside the low-power mode for a shorter interval between measuring the reference signal and monitoring the paging occasion, as compared with example 500 of FIG. 5, the UE conserves power and increases battery efficiency.

As shown in connection with reference number 615, the UE may receive a paging message in a paging occasion. For example, as described above in connection with reference number 515 of FIG. 5, the UE may receive a PDCCH message and/or a PDSCH message. When an identifier included in the PDSCH message does not correspond to an identifier associated with the UE, the UE may return to the low-power mode (e.g., not executing operations described below in connection with reference numbers 620 and 625). When the identifier included in the PDSCH message does correspond to an identifier associated with the UE, the UE may establish a connection with the base station (e.g., by executing operations described below in connection with reference numbers 620 and 625).

However, because the message described in connection with reference number 605 includes a threshold for the synchronization signal, the UE still has to measure the synchronization signal before initiating a random access procedure. Accordingly, as shown in connection with reference number 620, the UE may measure the synchronization signal. However, this causes the UE to waste processing resources as compared with example 500 of FIG. 5. Moreover, as described above in connection with reference number 510 of FIG. 5, many synchronization signals, such as SSBs, are transmitted with relatively low frequencies, such as 20 ms periodicity or longer. Accordingly, a latency between receiving the paging message (as described above in connection with reference number 615) and reestablishing an RRC connection with the base station (as described below in connection with reference number 625) is larger than a similar latency associated with example 500 of FIG. 5.

As shown in connection with reference number 625, the UE may reestablish an RRC connection with the base station (e.g., using a random access procedure). For example, the UE may initiate, with the base station, a random access procedure, such as a 2-step random access procedure, as described above in connection with FIG. 3, and/or a 4-step random access procedure, as described above in connection with FIG. 4. In some aspects, the UE may initiate the random access procedure by transmitting, to the base station, a random access preamble.

In some aspects, the UE may initiate the random access procedure based on the measurement described above in connection with reference number 620 satisfying a threshold (e.g., a threshold included in the message described above in connection with reference number 605). For example, the UE may initiate the random access procedure in a random access occasion associated with the synchronization signal when the measurement of the synchronization signal satisfies the threshold. The UE may search for an alternate synchronization signal associated with a different random access occasion when the measurement of the synchronization signal does not satisfy the threshold.

As indicated above, FIG. 6 is provided as an example. Other examples may differ from what is described with respect to FIG. 6.

Using techniques described above in connection with FIG. 5 result in inefficient use of battery power by the UE. Additionally, techniques described above in connection with FIG. 6, by using measurements of multiple signals from the base station, waste processing resources and increase latency between reception of a paging message and reestablishing an RRC connection with the base station.

Techniques and apparatuses described herein allow a UE (e.g., UE 120) to measure a reference signal that is not a CRS. For example, the UE 120 may measure a tracking reference signal (TRS), a channel state information reference signal (CSI-RS), and/or another reference signal that is not a CRS. The UE 120 may use the measurement to establish a random access channel (RACH) with a base station (e.g., base station 110). For example, the base station 110 may not transmit a CRS when the base station 110 is configured for 5G NR. Moreover, by using a TRS and/or CSI-RS, the UE 120 conserves power by remaining in a low-power mode (e.g., during or otherwise associated with an idle mode and/or an inactive state) for longer than if the UE 120 were to measure a synchronization signal (e.g., as described above in connection with FIG. 5). Additionally, the UE 120 conserves processing resources (e.g., as compared with the techniques described above in connection with FIG. 6) by avoiding measurement of the synchronization signal altogether.

Additionally, a UE cannot use the same calculation to determine a transmit power for a random access preamble based on a TRS, a CSI-RS, and/or another reference signal as is used based on a CRS. Accordingly, techniques and apparatuses described herein allow a UE (e.g., UE 120) to determine a transmit power for a random access preamble used to establish a RACH with a base station (e.g., base station 110) based on measuring a TRS, a CSI-RS, and/or another reference signal that is not a CRS. For example, the base station 110 may not transmit a CRS when the base station 110 is configured for 5G NR. By using a new determination for the measurements of the reference signal, the UE 120 may obtain a more accurate transmit power than if the UE 120 were to apply the existing determination for a synchronization signal (e.g., an SSB) to measurements of the reference signal. Moreover, by using measurements of a TRS and/or CSI-RS, the UE 120 may determine the transmit power for the random access preamble without measuring the synchronization signal. Accordingly, the UE 120 may conserve processing resources by avoiding measurement of the synchronization signal.

Figure 7:
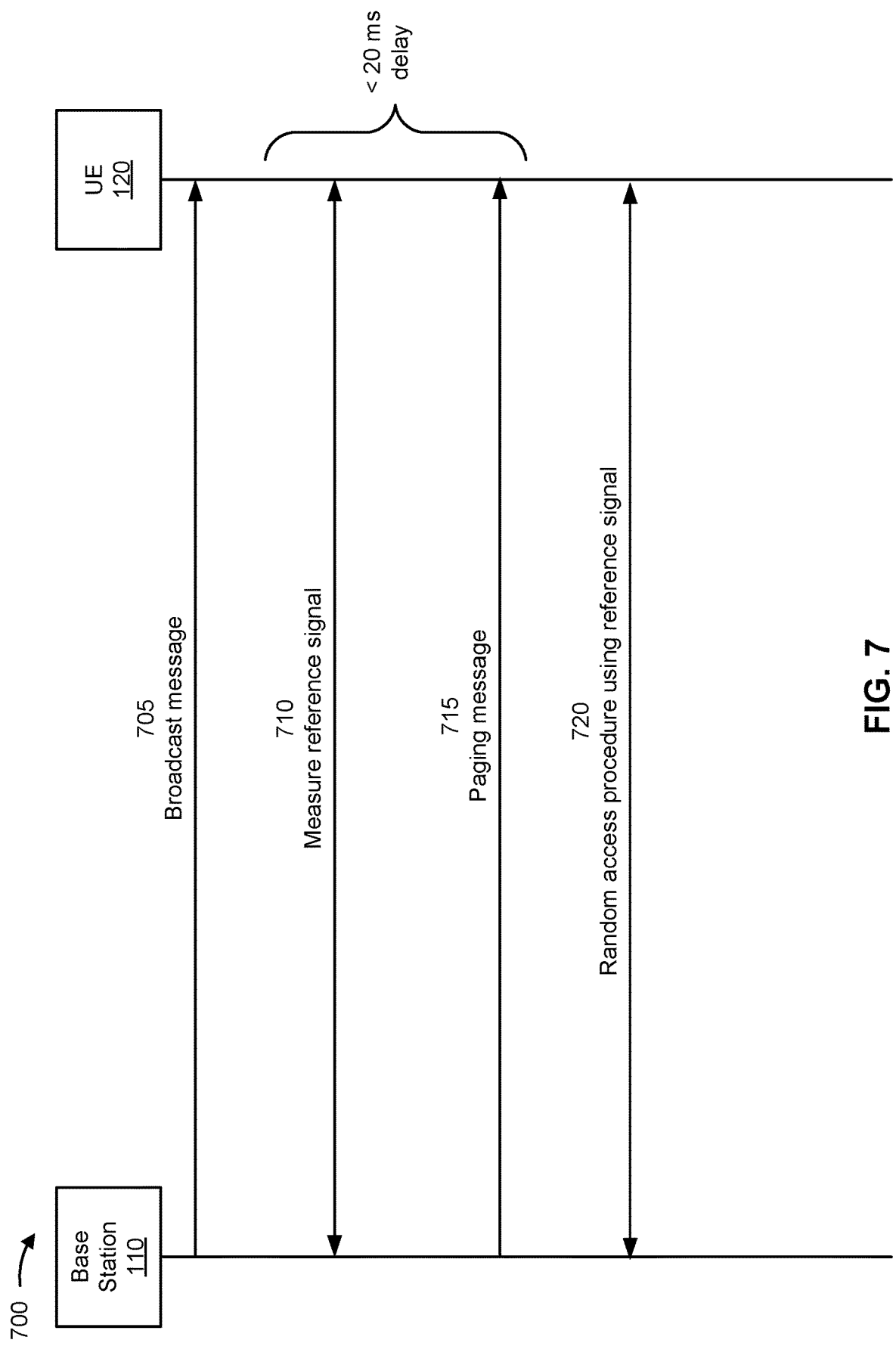
FIG. 7 is a diagram illustrating an example associated with initiating a random access procedure using a reference signal and with determining a transmit power for a random access preamble, in accordance with the present disclosure.

FIG. 7 is a diagram illustrating an example 700 of initiating a random access procedure using a reference signal, in accordance with the present disclosure. As shown in FIG. 7, example 700 includes a base station 110 in communication with a UE 120. The UE 120, in some aspects, may receive network service in a cell including the base station 110. For example, the UE 120 and the base station 110 may communicate on a 5G NR network.

As shown in connection with reference number 705, the base station 110 may transmit, and the UE 120 may receive, a message including at least one parameter associated with a random access procedure. For example, the message may be a broadcast message and/or a periodic message, such as a SIB message. Accordingly, the base station 110 may broadcast the signal to some, or even all, UEs served by the base station 110 and/or within range of the base station 110.

In some aspects, the at least one parameter may include at least one threshold. For example, the message may include an rsrp-ThresholdCSI-RS threshold (e.g., as defined in 3GPP specifications and/or another standard). Although the description herein focuses on the rsrp-ThresholdCSI-RS threshold, the description similarly applies to other thresholds. The UE 120 may apply the at least one threshold to measurements of a reference signal, as described below in connection with reference number 710. In some aspects, the at least one threshold may be distinct from at least one additional threshold associated with measurements of a synchronization signal, such as an SSB. For example, the at least one threshold may be distinct from an rsrp-ThresholdSSB threshold (e.g., as defined in 3GPP specifications and/or another standard). Although the description herein focuses on the rsrp-ThresholdSSB threshold, the description similarly applies to other thresholds.

Additionally, or alternatively, the at least one threshold may include a first threshold associated with a 2-step random access procedure (e.g., as described above in connection with FIG. 3) and a second threshold associated with a 4-step random access procedure (e.g., as described above in connection with FIG. 4). For example, the first threshold may be the rsrp-ThresholdCSI-RS threshold, and the second threshold may be an msgA-RSRP-ThresholdCSI-RS (e.g., as defined in 3GPP specifications and/or another standard). Although the description herein focuses on the msgA-RSRP-ThresholdCSI-RS threshold, the description similarly applies to other thresholds.

Additionally, or alternatively, the at least one parameter may include an identifier of one or more resources for the random access procedure. For example, the at least one parameter may include a Prach-ConfigurationIndexCSI-RS index (e.g., as defined in 3GPP specifications and/or another standard). Although the description herein focuses on the Prach-ConfigurationIndexCSI-RS index, the description similarly applies to other identifiers of the one or more resources for the random access procedure. In some aspects, the identifier may be associated with one or more frame numbers and/or subframe numbers for a random access occasion in which the UE 120 may perform the random access procedure.

Additionally, or alternatively, the at least one parameter may include at least one parameter associated with a transmit power for the random access procedure. For example, the at least one parameter, associated with the transmit power for the random access procedure, may include at least one of a target received power (e.g., a preambleReceivedTargetPowerCSI-RS power as defined by 3GPP specifications and/or another standard), a power ramping parameter (e.g., a powerRampingStepCSI-RS parameter as defined by 3GPP specifications and/or another standard), a power offset (e.g., a powerOffsetSS offset as defined by 3GPP specifications and/or another standard), or a combination thereof. Although the description herein focuses on the preambleReceivedTargetPowerCSI-RS power, powerRampingStepCSI-RS parameter, and powerOffsetSS offset, the description similarly applies to other target received powers, power ramping parameters, and power offsets, respectively. The UE 120 may use the at least one parameter to determine the transmit power for a random access preamble (e.g., as described below in connection with reference number 720) associated with the random access procedure.

Additionally, or alternatively, the at least one parameter may include a maximum number of transmissions for a random access occasion associated with the random access procedure. For example, the at least one parameter may include a preambleTransMaxCSI-RS quantity (e.g., as defined in 3GPP specifications and/or another standard) Although the description herein focuses on the preambleTransMaxCSI-RS quantity, the description similarly applies to other quantities indicating a maximum number of transmissions associated with the random access procedure. In some aspects, the maximum number of transmissions associated with the random access occasion associated with the reference signal (e.g., as described below) may be higher or lower than a maximum number of transmissions for a different random access occasion associated with a synchronization signal (e.g., an SSB).

As described above, the at least one parameter may include a target received power for the random access preamble (e.g., a preambleReceivedTargetPowerCSI-RS power, as defined by 3GPP specifications). In some aspects, the target received power is distinct from at least one additional target received power associated with a synchronization signal, such as an SSB. For example, the target received power may be distinct from a preambleReceivedTargetPower power (e.g., as defined by 3GPP specifications and/or another standard) or another similar power associated with the synchronization signal.

As described above, the at least one parameter may include a power control offset associated with the reference signal (e.g., a powerControlOffsetSS offset, as defined by 3GPP specifications). In some aspects, the power control offset may indicate (e.g., in dBm) a power offset for the reference signal as compared to a default power. For example, the default power may include an ss-PBCH-Block-Power power (e.g., as defined by 3GPP specifications and/or another standard) or another similar power associated with the synchronization signal.

Additionally, or alternatively, the at least one parameter may include one or more weights for use in a pathloss estimate. For example, the one or more weights may include a higher layer filter configuration (e.g., as defined by 3GPP specifications and/or another standard) or another similar filtering function. In some aspects, the UE 120 may apply the one or more weights to measurements of the reference signal when determining the pathloss estimate. For example, the measurements may include an RSRP, a signal-to-interference-and-noise ratio (SINR), and/or another L1 measurement of the reference signal.

As shown in connection with reference number 710, the base station 110 may transmit, and the UE 120 may receive, the reference signal for the UE 120 to measure. In some aspects, the random access procedure may be based at least in part on measurements of the reference signal. For example, the UE 120 may determine the random access occasion for the random access procedure based at least in part on the reference signal.

In some aspects, the UE 120 may be in a low-power mode when receiving the reference signal. For example, the low-power mode may be associated with an idle mode, an inactive state, or a combination thereof.

In some aspects, the reference signal is not a CRS. For example, when base station 110 communicates with the UE 120 on a 5G NR network, the base station 110 may not transmit a CRS. Accordingly, in some aspects, the reference signal may include at least one of a TRS, a CSI-RS, or a combination thereof.

In some aspects, and as described above, the measurements of the reference signal may include an RSRP. Additionally, or alternatively, the measurements of the reference signal may include another L1 measurement, such as an SINR.

In some aspects, the UE 120 may measure the reference signal based at least in part on a paging occasion (e.g., as described below in connection with reference number 715). For example, the UE 120 may determine that the reference signal is scheduled (e.g., according to a periodicity) within a threshold time of the paging occasion. Accordingly, the UE 120 may measure the reference signal before expecting a possible paging message from the base station 110. Because the reference signal (such as a TRS or a CSI-RS) is transmitted with greater frequency than a synchronization signal (such as an SSB), the UE 120 incurs less delay between measuring the reference signal and receiving the paging message than the delay incurred between measuring the synchronization signal and receiving the paging message in example 500 of FIG. 5.

As shown in connection with reference number 715, the base station 110 may transmit, and the UE 120 may receive, a paging message for the UE 120. For example, the UE 120 may monitor a paging occasion and receive the paging message based at least in part on the monitoring. The paging occasion may be RRC configured by the base station 110 and/or preconfigured by the UE 120 (e.g., according to 3GPP specifications and/or another standard).

In some aspects, the paging message may include a PDCCH message. For example, the PDCCH message may include DCI with a CRC scrambled by an RNTI associated with a group of UEs including the UE 120, such as a P-RNTI. Additionally, or alternatively, the paging message may include a PDSCH message. The PDSCH message may include an IMSI and/or another unique (or at least quasi-unique) identifier. Accordingly, the UE 120 may decode the PDSCH message to determine whether the base station 110 is trying to page the UE 120. When the identifier included in the PDSCH message does not correspond to an identifier associated with the UE 120, the UE may return to the low-power mode (e.g., not executing operations described below in connection with reference number 720). When the identifier included in the PDSCH message does correspond to an identifier associated with the UE 120, the UE 120 may establish a connection with the base station 110 (e.g., by executing operations described below in connection with reference number 720).

As shown in connection with reference number 720, the UE 120 may initiate, with the base station 110, a random access procedure based at least in part on the measurements of the reference signal. For example, the UE 120 may transmit, and the base station 110 may receive, a random access preamble. In some aspects, the random access preamble may include the identifier of one or more resources for the random access procedure as described above in connection with reference number 705. For example, the random access preamble may include the Prach-ConfigurationIndexCSI-RS index.

In some aspects, initiating the random access procedure may comprise transmitting a random access preamble with a transmit power based at least in part on the at least one parameter, as described above in connection with reference number 705. For example, based at least in part on measurements of the reference signal, the UE 120 may transmit, and the base station 110 may receive, the random access preamble with the transmit power based at least in part on the at least one parameter. In some aspects, the UE 120 may transmit the random access preamble in a random access occasion determined based at least in part on the reference signal.

In some aspects, the transmit power for the random access preamble may be based at least in part on the measurements of the reference signal as described above in connection with reference number 715. For example, the transmit power may be based at least in part on one or more L1 measurements of the reference signal, such as an RSRP, an SINR, and/or another L1 measurement. In some aspects, the measurements may be in dBm.

Additionally, or alternatively, the UE 120 may calculate the transmit power based at least in part on the at least one parameter and use an antenna of the UE 120 to transmit the random access preamble with the calculated transmit power. For example, the at least one parameter may include a target received power for the random access preamble, and the UE 120 may determine the transmit power based at least in part on the target received power. Additionally, or alternatively, the at least one parameter may include a power control offset for a pathloss estimate and/or one or more weights for the pathloss estimate, and the UE 120 may determine the transmit power based at least in part on the pathloss estimate. Additionally, or alternatively, in some aspects, the pathloss estimate may be based at least in part on a measurement of the reference signal. For example, the UE 120 may apply the one or more weights to the measurement of the reference signal when determining the pathloss estimate.

In some aspects, the transmit power may be based on a combination of the parameters described above. For example, the UE 120 may determine the transmit power based at least in part on an expression similar to the following form:

$$P_{PRACH,b,f,c}(i) = \text{Min}\{P_{CMAX,f,c}(i), P_{PRACH,target,f,c} + PL_{b,f,c}\},$$

where $P_{PRACH,b,f,c}(i)$ may represent the transmit power for the random access preamble; $P_{CMAX,f,c}(i)$ may represent a maximum output power configured for the UE 120 (e.g., RRC configured from the base station 110 and/or preconfigured for the UE 120 according to 3GPP specifications); $P_{PRACH,target,f,c}$ may represent a target received power associated with the reference signal (e.g., included in the signal from the base station 110); and $PL_{b,f,c}$ may represent a pathloss estimate. In this example, b may represent a bandwidth part (BWP), associated with an uplink connection, to the base station 110, for the random access preamble; f may represent a carrier including the BWP; c may represent a cell serving the UE 120 and including the base station 110; and i may represent a random access occasion in which the UE 120 transmits the random access preamble. In some aspects, the pathloss estimate may be determined as ss-PBCH-BlockPower+powerControlOffsetSS−(measurements of the reference signal), where ss-PBCH-BlockPower represents a default power (e.g., as described above in connection with reference number 505); powerControlOffsetSS represents a power control offset associated with the reference signal (e.g., included in the signal from the base station 110); and/or the measurements of the reference signal are filtered according to one or more weights associated with the reference signal (e.g., included in the signal from the base station 110).

In some aspects, the random access procedure may include a 2-step random access procedure (e.g., as described above in connection with FIG. 3) or a 4-step random access procedure (e.g., as described above in connection with FIG. 4). Accordingly, in some aspects, the random access preamble may include a 2-step random access preamble (e.g., a msgA for a 2-step random access procedure as described above in connection with FIG. 3) or a 4-step random access preamble (e.g., a msg1 for a 4-step random access procedure as described above in connection with FIG. 4). In some aspects, when the at least one parameter includes the first threshold and the second threshold (as described above in connection with reference number 705), the UE 120 may determine whether to initiate a 2-step random access procedure or a 4-step random access procedure based at least in part on the measurements, the first threshold, and the second threshold. For example, the UE 120 may determine whether the measurements satisfy the first threshold or the second threshold to determine whether to initiate a 2-step random access procedure or a 4-step random access procedure, respectively. In some aspects, when the measurements satisfy the first threshold and the second threshold, the UE 120 may determine whether to initiate a 2-step random access procedure or a 4-step random access procedure based at least in part on whether the measurements satisfy the first threshold by a larger amount than the second threshold, or the second threshold by a larger amount than the first threshold, respectively.

In some aspects, the UE 120 may initiate the random access procedure based at least in part on receiving a paging message (e.g., as described above in connection with reference number 715). Because the UE 120 may initiate the random access procedure without further measuring a synchronization signal, the UE 120 incurs less delay between receiving the paging message and initiating the random access procedure than the delay between receiving the paging message and initiating the random access procedure incurred in example 600 of FIG. 6. Moreover, the UE 120 conserves processing resources by not measuring the synchronization signal as compared with the UE in example 500 of FIG. 5.

As indicated above, FIG. 7 is provided as an example. Other examples may differ from what is described with respect to FIG. 7.

Figure 8:
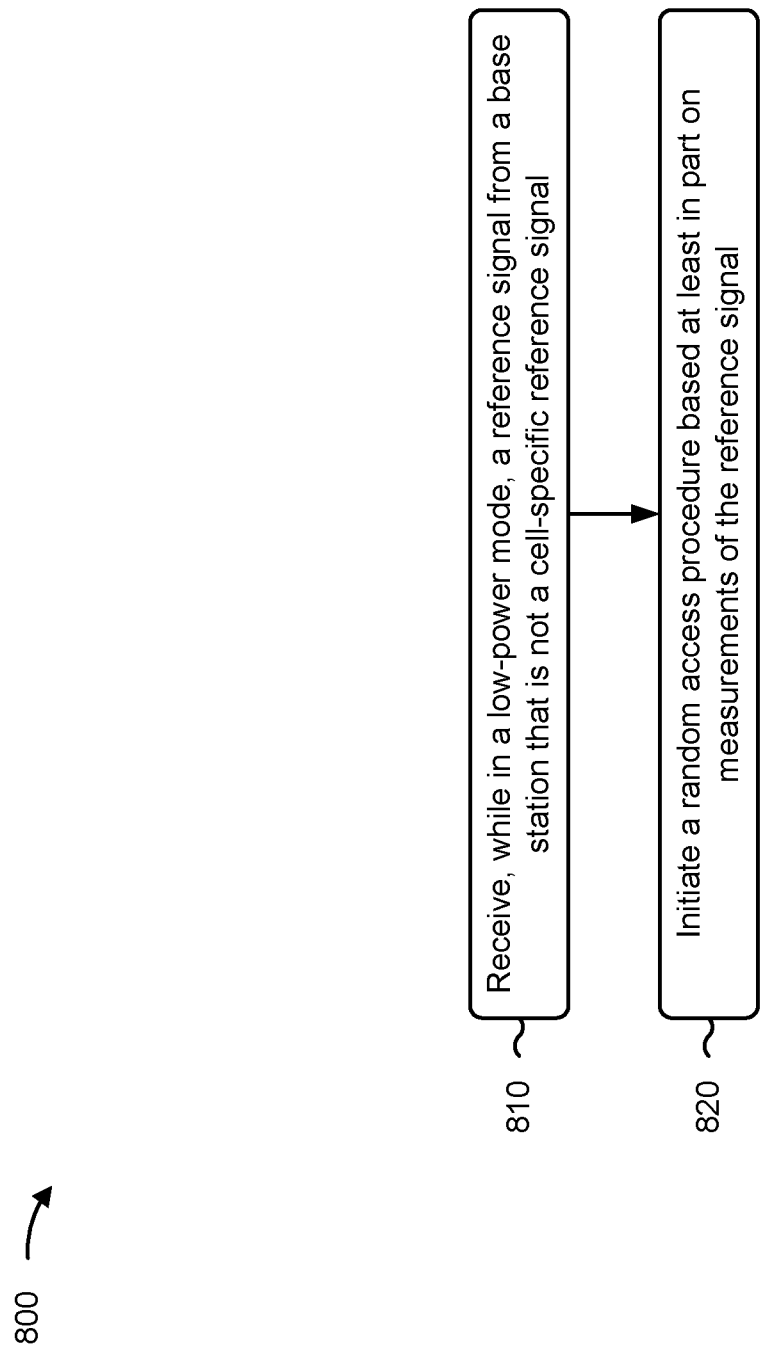
FIG. 8 is a diagram illustrating an example process performed by a UE, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1200 of FIG. 12) performs operations associated with performing random access procedures using reference signals.

As shown in FIG. 8, in some aspects, process 800 may include receiving, while the UE is in a low-power mode, a reference signal from a base station (e.g., base station 110 and/or apparatus 1300 of FIG. 13) (block 810). For example, the UE (e.g., using reception component 1202, depicted in FIG. 12) may receive, while the UE is in the low-power mode, a reference signal from a base station, as described herein. In some aspects, the reference signal is not a CRS.

As further shown in FIG. 8, in some aspects, process 800 may include initiating, with the base station, a random access procedure based at least in part on measurements of the reference signal (block 820). For example, the UE (e.g., using reception component 1202 and/or transmission component 1204, depicted in FIG. 12) may initiate, with the base station, a random access procedure based at least in part on measurements of the reference signal, as described herein.

Process 800 may include additional aspects, such as any single aspect or any combination of aspects described below and/or in connection with one or more other processes described elsewhere herein.

In a first aspect, the UE communicates with the base station on a 5G NR network.

In a second aspect, alone or in combination with the first aspect, the low-power mode is associated with an idle mode, an inactive state, or a combination thereof.

In a third aspect, alone or in combination with one or more of the first and second aspects, the reference signal includes at least one of a TRS, a CSI-RS, or a combination thereof.

In a fourth aspect, alone or in combination with one or more of the first through third aspects, the measurements of the reference signal include an RSRP.

In a fifth aspect, alone or in combination with one or more of the first through fourth aspects, the random access procedure includes a 2-step random access procedure or a 4-step random access procedure.

In a sixth aspect, alone or in combination with one or more of the first through fifth aspects, process 800 further includes receiving (e.g., using reception component 1202), from the base station, a message including at least one parameter associated with the random access procedure, such that the random access procedure is initiated based at least in part on the at least one parameter.

In a seventh aspect, alone or in combination with one or more of the first through sixth aspects, the message is a SIB message.

In an eighth aspect, alone or in combination with one or more of the first through seventh aspects, the at least one parameter includes at least one threshold, and the random access procedure is initiated based at least in part on the measurements, of the reference signal, satisfying the threshold.

In a ninth aspect, alone or in combination with one or more of the first through eighth aspects, the at least one threshold is distinct from at least one additional threshold associated with measurements of a synchronization signal.

In a tenth aspect, alone or in combination with one or more of the first through ninth aspects, the synchronization signal includes an SSB.

In an eleventh aspect, alone or in combination with one or more of the first through tenth aspects, the at least one threshold includes a first threshold associated with a 2-step random access procedure and a second threshold associated with a 4-step random access procedure.

In a twelfth aspect, alone or in combination with one or more of the first through eleventh aspects, process 800 further includes determining (e.g., using determination component 1210, depicted in FIG. 12) whether to initiate a 2-step random access procedure or a 4-step random access procedure based at least in part on the measurements, the first threshold, and the second threshold.

In a thirteenth aspect, alone or in combination with one or more of the first through twelfth aspects, the at least one parameter includes an identifier of one or more resources for the random access procedure initiated by transmitting a random access preamble, and the random access preamble includes the identifier.

In a fourteenth aspect, alone or in combination with one or more of the first through thirteenth aspects, the at least one parameter includes at least one parameter associated with a transmit power for a random access preamble, and the random access procedure is initiated by transmission of the random access preamble with the transmit power.

In a fifteenth aspect, alone or in combination with one or more of the first through fourteenth aspects, the at least one parameter, associated with the transmit power for the random access preamble, includes at least one of a target received power, a power ramping parameter, a power control offset, or a combination thereof.

In a sixteenth aspect, alone or in combination with one or more of the first through fifteenth aspects, the at least one parameter includes a maximum number of transmissions for a random access occasion associated with the random access procedure.

In a seventeenth aspect, alone or in combination with one or more of the first through sixteenth aspects, process 800 further includes monitoring (e.g., using reception component 1202) a paging occasion, such that the reference signal is received based at least in part on monitoring the paging occasion; and receiving (e.g., using reception component 1202), from the base station and based at least in part on the monitoring, a paging message for the UE, such that the random access procedure is initiated based at least in part on receiving the paging message.

In an eighteenth aspect, alone or in combination with one or more of the first through seventeenth aspects, a random access occasion for initiating the random access procedure is selected based at least in part on the reference signal.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
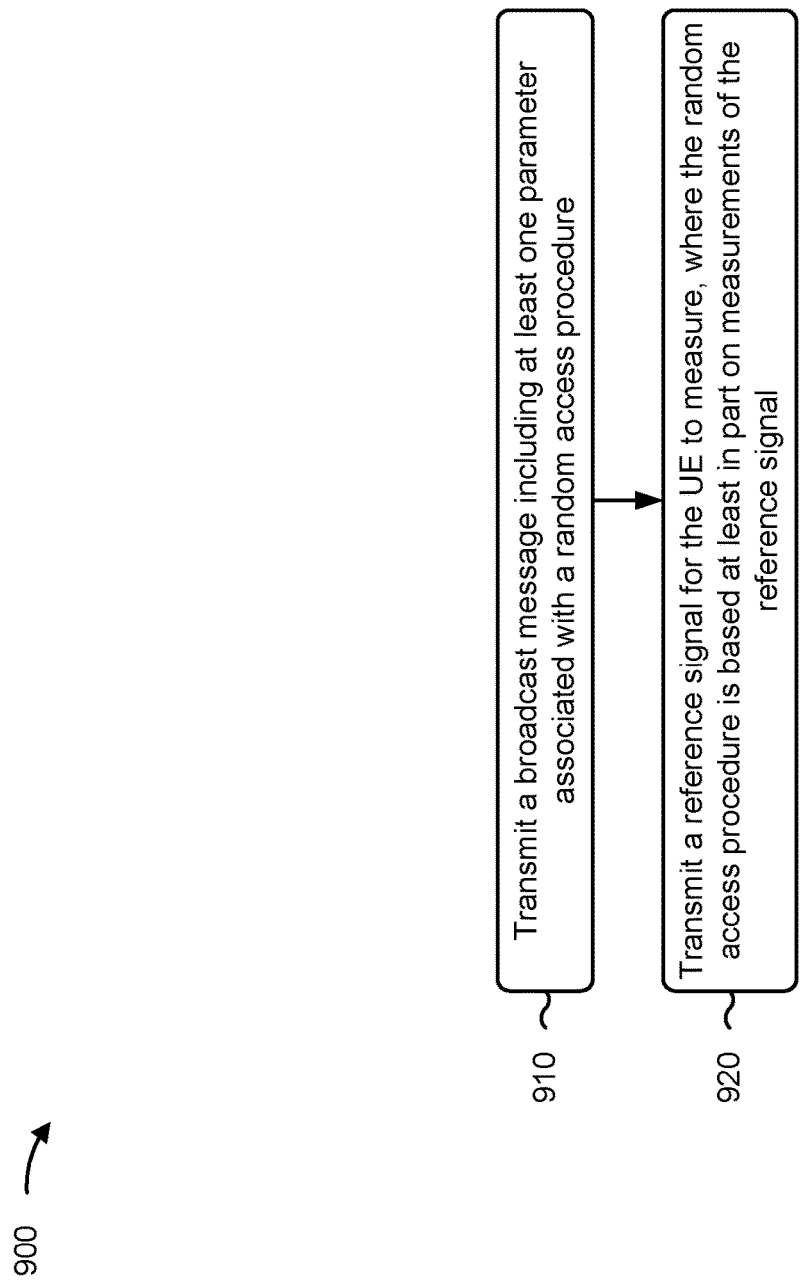
FIG. 9 is a diagram illustrating an example process performed by a base station, in accordance with the present disclosure.

FIG. 9 is a diagram illustrating an example process 900 performed, for example, by a base station, in accordance with the present disclosure. Example process 900 is an example where the base station (e.g., base station 110 and/or apparatus 1300 of FIG. 13) performs operations associated with performing random access procedures using reference signals.

As shown in FIG. 9, in some aspects, process 900 may include transmitting, to a UE (e.g., UE 120 and/or apparatus 1200 of FIG. 12), a broadcast message including at least one parameter associated with a random access procedure (block 910). For example, the base station (e.g., using broadcast component 1308 and/or transmission component 1304, depicted in FIG. 13) may transmit, to a UE, a broadcast message including at least one parameter associated with a random access procedure, as described herein.

As further shown in FIG. 9, in some aspects, process 900 may include transmitting, to the UE, a reference signal for the UE to measure (block 920). For example, the base station (e.g., using transmission component 1304) may transmit, to the UE, a reference signal for the UE to measure, as described herein. In some aspects, the random access procedure is based at least in part on measurements of the reference signal.

Process 900 may include additional aspects, such as any single aspect or any combination of aspects described below and/or in connection with one or more other processes described elsewhere herein.

In a first aspect, the base station communicates with the UE on a 5G NR network.

In a second aspect, alone or in combination with the first aspect, the reference signal is transmitted to the UE when the UE is in an idle mode, an inactive state, or a combination thereof.

In a third aspect, alone or in combination with one or more of the first and second aspects, the reference signal includes at least one of a TRS, a CSI-RS, or a combination thereof.

In a fourth aspect, alone or in combination with one or more of the first through third aspects, the measurements of the reference signal include an RSRP.

In a fifth aspect, alone or in combination with one or more of the first through fourth aspects, the random access procedure includes a 2-step random access procedure or a 4-step random access procedure.

In a sixth aspect, alone or in combination with one or more of the first through fifth aspects, process 900 further includes receiving (e.g., using reception component 1302, depicted in FIG. 13), from the UE, a random access preamble associated with the random access procedure.

In a seventh aspect, alone or in combination with one or more of the first through sixth aspects, process 900 further includes transmitting (e.g., using transmission component 1304), to the UE, a paging message for the UE, such that the random access preamble is received based at least in part on transmitting the paging message.

In an eighth aspect, alone or in combination with one or more of the first through seventh aspects, the broadcast message is a SIB message.

In a ninth aspect, alone or in combination with one or more of the first through eighth aspects, the at least one parameter includes at least one threshold, and the measurements of the reference signal include a determination of whether the measurements satisfy the at least one threshold.

In a tenth aspect, alone or in combination with one or more of the first through ninth aspects, the at least one threshold is distinct from at least one additional threshold associated with measurements of a synchronization signal.

In an eleventh aspect, alone or in combination with one or more of the first through tenth aspects, the synchronization signal includes an SSB.

In a twelfth aspect, alone or in combination with one or more of the first through eleventh aspects, the at least one threshold includes a first threshold associated with a 2-step random access procedure and a second threshold associated with a 4-step random access procedure.

In a thirteenth aspect, alone or in combination with one or more of the first through twelfth aspects, process 900 further includes receiving (e.g., using reception component 1302), from the UE, a 2-step random access preamble or a 4-step random access preamble based at least in part on the measurements of the reference signal, the first threshold, and the second threshold.

In a fourteenth aspect, alone or in combination with one or more of the first through thirteenth aspects, the at least one parameter includes an identifier of one or more resources for the random access procedure.

In a fifteenth aspect, alone or in combination with one or more of the first through fourteenth aspects, the at least one parameter includes at least one parameter associated with a transmit power for the random access procedure.

In a sixteenth aspect, alone or in combination with one or more of the first through fifteenth aspects, the at least one parameter, associated with the transmit power for the random access procedure, includes at least one of a target received power, a power ramping parameter, a power control offset, or a combination thereof.

In a seventeenth aspect, alone or in combination with one or more of the first through sixteenth aspects, the at least one parameter includes a maximum number of transmissions for a random access occasion associated with the random access procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
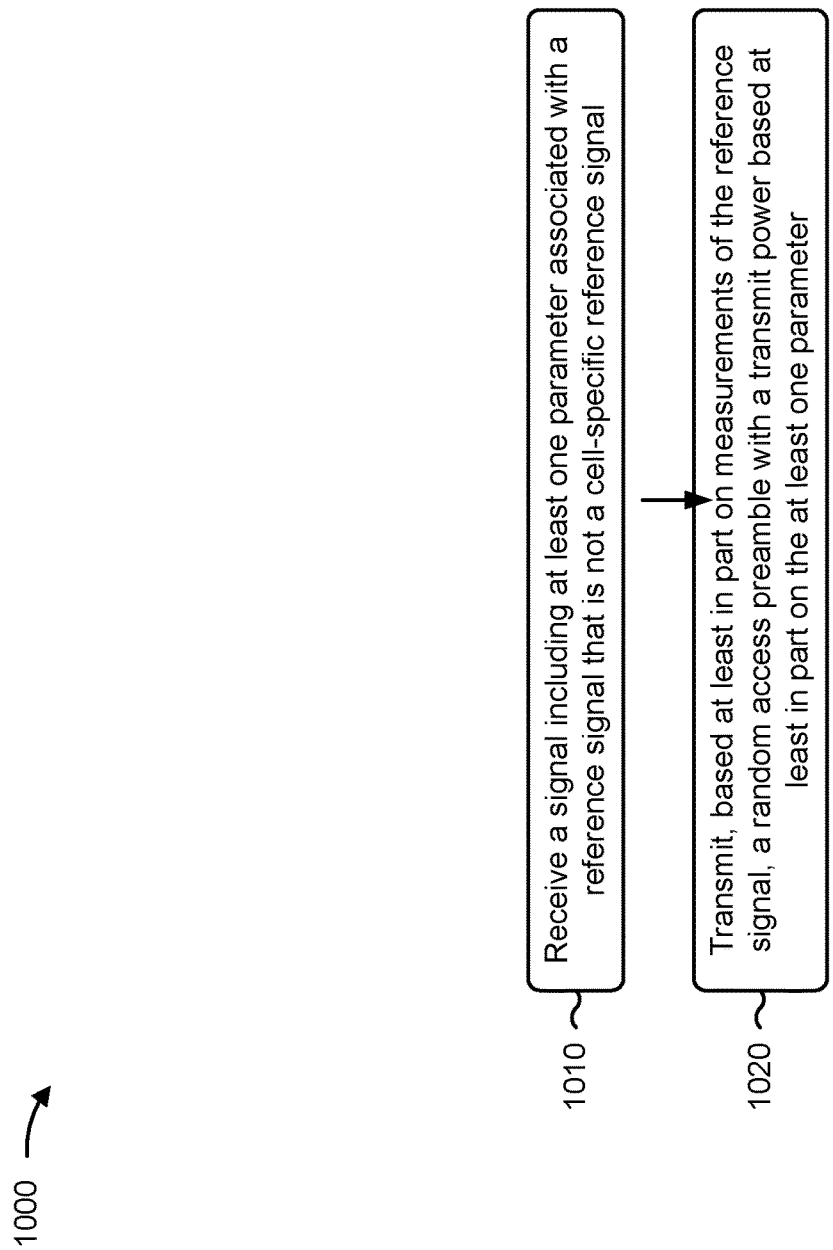
FIG. 10 is a diagram illustrating another example process performed by a UE, in accordance with the present disclosure.

FIG. 10 is a diagram illustrating an example process 1000 performed, for example, by a UE, in accordance with the present disclosure. Example process 1000 is an example where the UE (e.g., UE 120 and/or apparatus 1200 of FIG. 12) performs operations associated with determining transmit power for random access preambles.

As shown in FIG. 10, in some aspects, process 1000 may include receiving, from a base station (e.g., base station 110 and/or apparatus 1300 of FIG. 13), a signal including at least one parameter associated with a reference signal (block 1010). For example, the UE (e.g., using reception component 1202, depicted in FIG. 12) may receive, from a base station, a signal including at least one parameter associated with a reference signal, as described herein. In some aspects, the reference signal is not a CRS.

As further shown in FIG. 10, in some aspects, process 1000 may include transmitting, to the base station and based at least in part on measurements of the reference signal, a random access preamble with a transmit power based at least in part on the at least one parameter (block 1020). For example, the UE (e.g., using transmission component 1204, depicted in FIG. 12) may transmit, to the base station and based at least in part on measurements of the reference signal, a random access preamble with a transmit power based at least in part on the at least one parameter, as described herein.

Process 600 may include additional aspects, such as any single aspect or any combination of aspects described below and/or in connection with one or more other processes described elsewhere herein.

In a first aspect, the UE communicates with the base station on a 5G NR network.

In a second aspect, alone or in combination with the first aspect, the reference signal includes at least one of a TRS, a CSI-RS, or a combination thereof.

In a third aspect, alone or in combination with one or more of the first and second aspects, the random access preamble includes a 2-step random access preamble or a 4-step random access preamble.

In a fourth aspect, alone or in combination with one or more of the first through third aspects, the signal is a broadcast message.

In a fifth aspect, alone or in combination with one or more of the first through fourth aspects, the broadcast message is a SIB message.

In a sixth aspect, alone or in combination with one or more of the first through fifth aspects, the at least one parameter includes a target received power for the random access preamble.

In a seventh aspect, alone or in combination with one or more of the first through sixth aspects, the transmit power is based at least in part on the target received power for the random access preamble.

In an eighth aspect, alone or in combination with one or more of the first through seventh aspects, the target received power is distinct from at least one additional target received power associated with a synchronization signal.

In a ninth aspect, alone or in combination with one or more of the first through eighth aspects, the synchronization signal includes an SSB.

In a tenth aspect, alone or in combination with one or more of the first through ninth aspects, the at least one parameter includes a power control offset associated with the reference signal.

In an eleventh aspect, alone or in combination with one or more of the first through tenth aspects, the transmit power is based at least in part on a pathloss estimate, and the pathloss estimate is based at least in part on the power control offset.

In a twelfth aspect, alone or in combination with one or more of the first through eleventh aspects, the transmit power is based at least in part on a pathloss estimate, and the pathloss estimate is based at least in part on a measurement of the reference signal.

In a thirteenth aspect, alone or in combination with one or more of the first through twelfth aspects, the at least one parameter includes one or more weights, and the pathloss estimate is based at least in part on applying the one or more weights to the measurement of the reference signal.

In a fourteenth aspect, alone or in combination with one or more of the first through thirteenth aspects, process 1000 further includes monitoring (e.g., using reception component 1202) a paging occasion; receiving (e.g., using reception component 1202), from the base station and based at least in part on monitoring the paging occasion, a paging message for the UE; and transmitting (e.g., using transmission component 1204) the random access preamble is based at least in part on receiving the paging message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
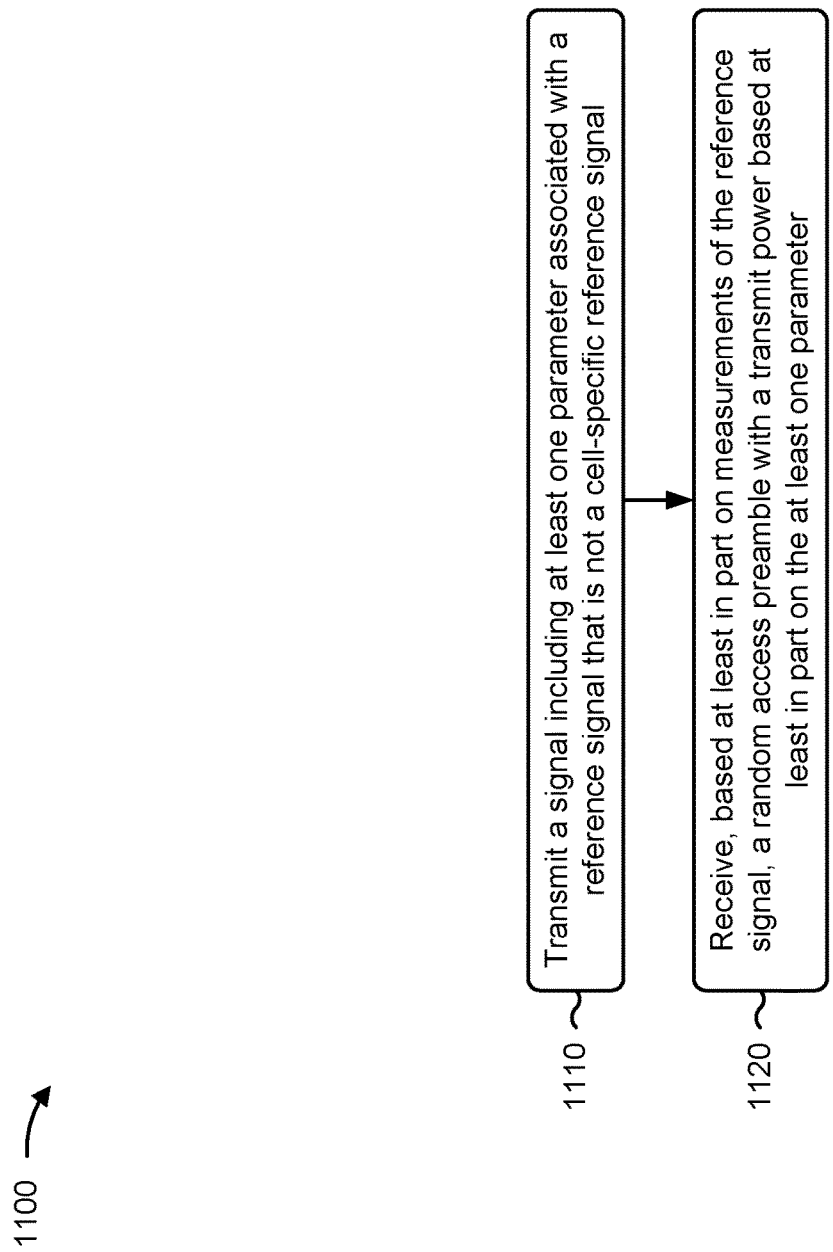
FIG. 11 is a diagram illustrating another example process performed by a base station, in accordance with the present disclosure.

FIG. 11 is a diagram illustrating an example process 1100 performed, for example, by a base station, in accordance with the present disclosure. Example process 1100 is an example where the base station (e.g., base station 110 and/or apparatus 1300 of FIG. 13) performs operations associated with determining transmit power for random access preambles.

As shown in FIG. 11, in some aspects, process 1100 may include transmitting, to a UE (e.g., UE 120 and/or apparatus 1200 of FIG. 12), a signal including at least one parameter associated with a reference signal (block 1110). For example, the base station (e.g., using broadcast component 1308 and/or transmission component 1304, depicted in FIG. 13) may transmit, to a UE, a signal including at least one parameter associated with a reference signal, as described herein. In some aspects, the reference signal is not a CRS.

As further shown in FIG. 11, in some aspects, process 1100 may include receiving, from the UE and based at least in part on measurements of the reference signal, a random access preamble with a transmit power based at least in part on the at least one parameter (block 1120). For example, the base station (e.g., using reception component 1302, depicted in FIG. 13) may receive, from the UE and based at least in part on measurements of the reference signal, a random access preamble with a transmit power based at least in part on the at least one parameter, as described herein.

Process 1100 may include additional aspects, such as any single aspect or any combination of aspects described below and/or in connection with one or more other processes described elsewhere herein.

In a first aspect, the base station communicates with the UE on a 5G NR network.

In a second aspect, alone or in combination with the first aspect, the reference signal includes at least one of a TRS, a CSI-RS, or a combination thereof.

In a third aspect, alone or in combination with one or more of the first and second aspects, the random access preamble includes a 2-step random access preamble or a 4-step random access preamble.

In a fourth aspect, alone or in combination with one or more of the first through third aspects, the signal is a broadcast message.

In a fifth aspect, alone or in combination with one or more of the first through fourth aspects, the broadcast message is a SIB message.

In a sixth aspect, alone or in combination with one or more of the first through fifth aspects, the at least one parameter includes a target received power for the random access preamble.

In a seventh aspect, alone or in combination with one or more of the first through sixth aspects, the transmit power is based at least in part on the target received power for the random access preamble.

In an eighth aspect, alone or in combination with one or more of the first through seventh aspects, the target received power is distinct from at least one additional target received power associated with a synchronization signal.

In a ninth aspect, alone or in combination with one or more of the first through eighth aspects, the synchronization signal includes an SSB.

In a tenth aspect, alone or in combination with one or more of the first through ninth aspects, the at least one parameter includes a power control offset associated with the reference signal.

In an eleventh aspect, alone or in combination with one or more of the first through tenth aspects, the transmit power is based at least in part on a pathloss estimate, and the pathloss estimate is based at least in part on the power control offset.

In a twelfth aspect, alone or in combination with one or more of the first through eleventh aspects, the transmit power is based at least in part on a pathloss estimate, and the pathloss estimate is based at least in part on a measurement of the reference signal.

In a thirteenth aspect, alone or in combination with one or more of the first through twelfth aspects, the at least one parameter includes one or more weights, and the pathloss estimate is based at least in part on applying the one or more weights to the measurement of the reference signal.

In a fourteenth aspect, alone or in combination with one or more of the first through thirteenth aspects, process 1100 further includes transmitting (e.g., using transmission component 1304), to the UE, a paging message for the UE, such that the random access preamble is received based at least in part on transmitting the paging message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
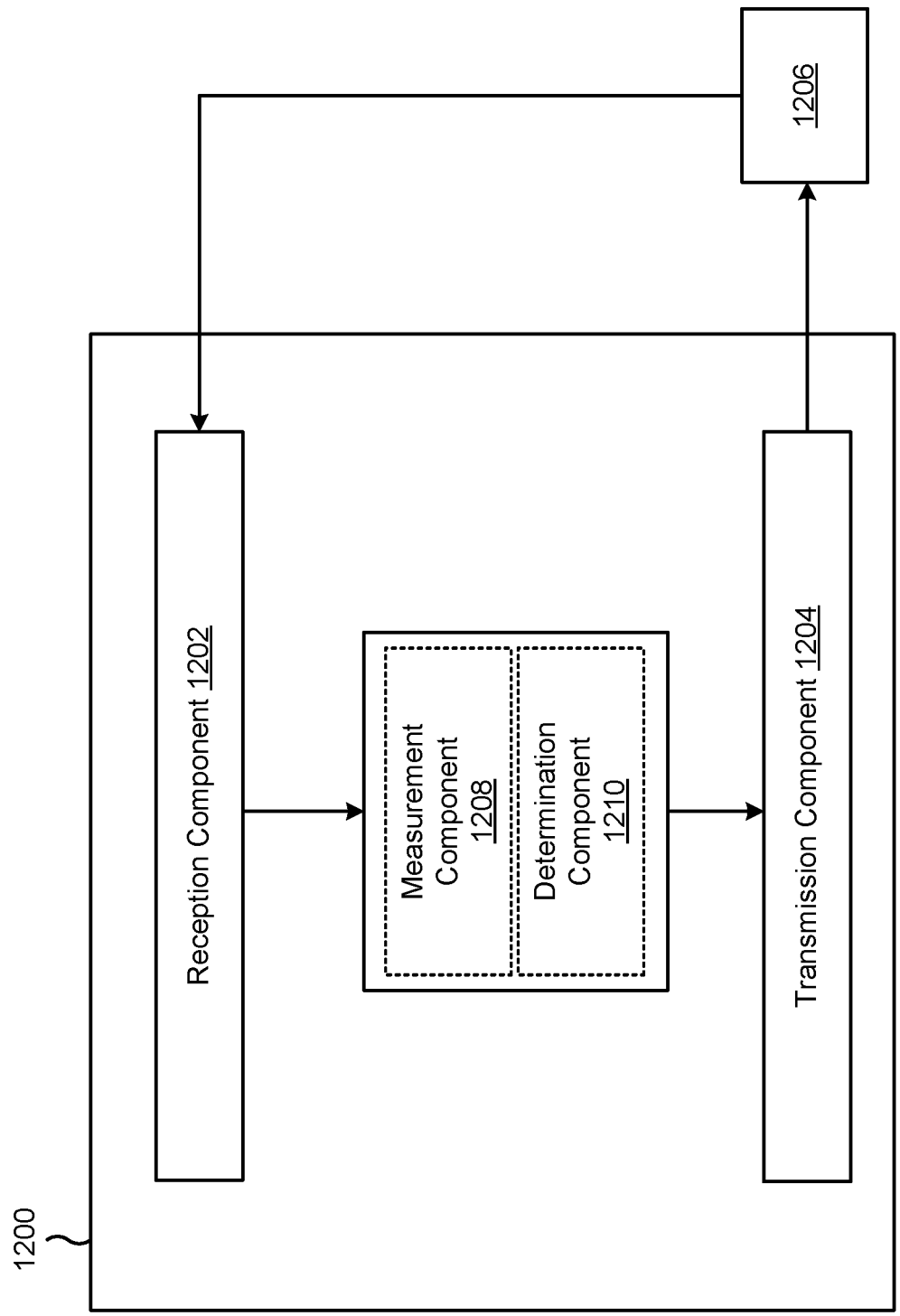
FIGS. 12 and 13 are block diagrams of example apparatuses for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a measurement component 1208 and/or a determination component 1210, among other examples.

In some aspects, the apparatus 1200 may be configured to perform one or more operations described herein in connection with FIG. 7. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

In some aspects, the reception component 1202 may receive (e.g., from the apparatus 1206), while the apparatus 1200 is in a low-power mode, a reference signal. For example, the low-power mode may include an idle mode or an inactive state (e.g., as defined according to 3GPP specifications and/or another standard). In some aspects, the reference signal is not a CRS. The measurement component 1208 may measure the reference signal. For example, the measurements may include an RSRP and/or other L1 measurements. Accordingly, transmission component 1204 may initiate a random access procedure based at least in part on the measurements of the reference signal. For example, the transmission component 1204 may transmit (e.g., to the apparatus 1206) a random access preamble. In some aspects, the transmission component 1204 may initiate the random access procedure when the measurements satisfy at least one threshold.

Additionally, or alternatively, the reception component 1202 may receive (e.g., from the apparatus 1206) a signal including at least one parameter associated with a reference signal. The reception component 1202 may further receive (e.g., from the apparatus 1206) the reference signal. In some aspects, the reference signal is not a CRS. Accordingly, the determination component 1210 may determine a transmit power based at least in part on the at least one parameter and/or measurements of the reference signal. The transmission component 1204 may transmit (e.g., to the apparatus 1206) a random access preamble based at least in part on the transmit power.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
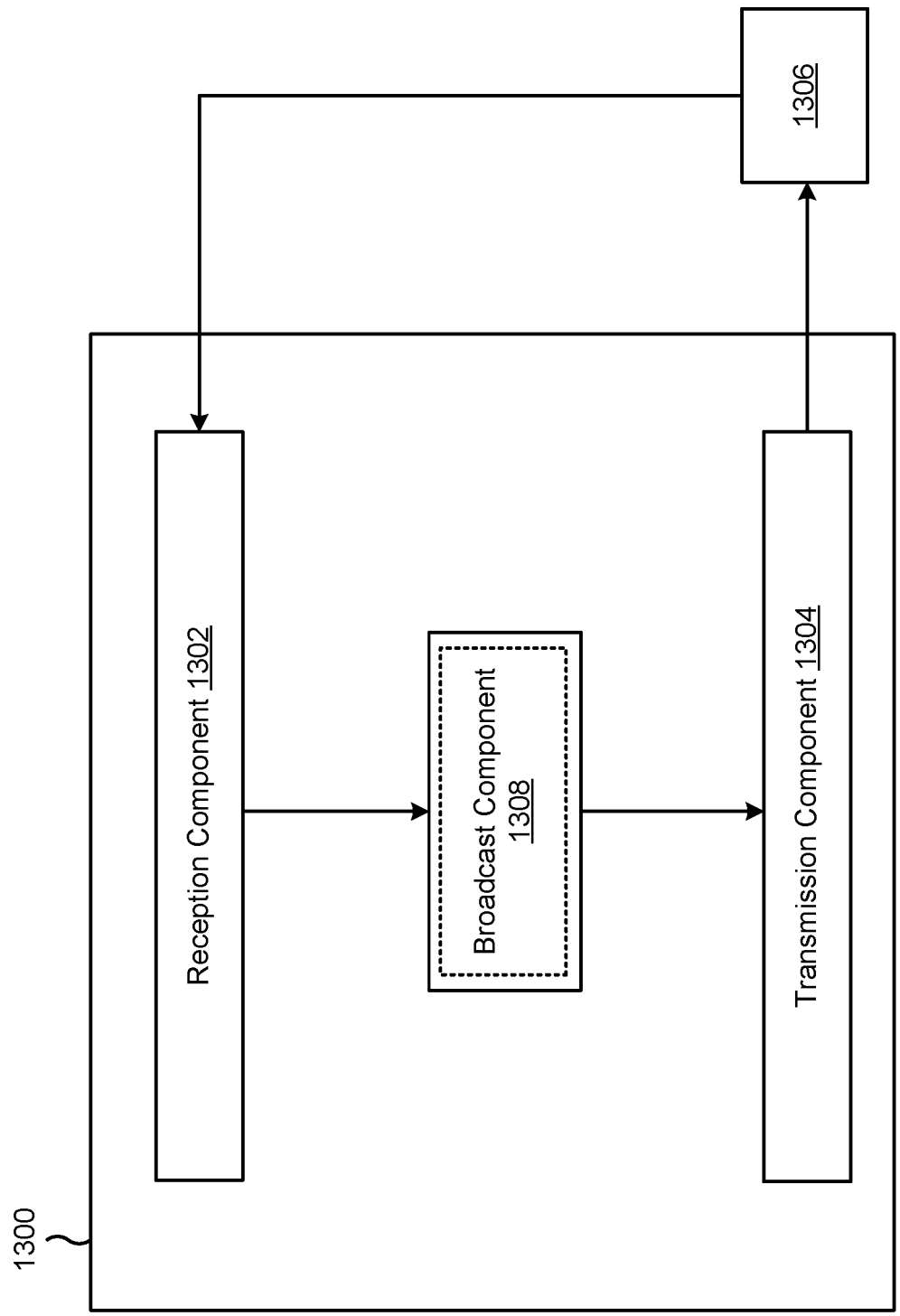

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a broadcast component 1308, among other examples.

In some aspects, the apparatus 1300 may be configured to perform one or more operations described herein in connection with FIG. 7. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

In some aspects, the broadcast component 1308 may encode a broadcast message with at least one parameter associated with a reference signal. Accordingly, transmission component 1304 may transmit (e.g., to the apparatus 1306) the broadcast message. The reception component 1302 may receive (e.g., from the apparatus 1306) a random access preamble based at least in part on the at least one parameter.

In some aspects, the transmission component 1304 may further transmit (e.g., to the apparatus 1306) the reference signal. In some aspects, the reference signal is not a CRS. The reference signal may be measured by the apparatus 1306. In some aspects, the apparatus 1306 may be in an idle mode, an inactive state, or a combination thereof when the reference signal is sent.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, while the UE is in a low-power mode, a reference signal from a base station, wherein the reference signal is not a cell-specific reference signal; and initiating, with the base station, a random access procedure based at least in part on measurements of the reference signal.

Aspect 2: The method of Aspect 1, wherein the UE communicates with the base station on a 5G New Radio network.

Aspect 3: The method of any of Aspects 1 through 2, wherein the low-power mode is associated with an idle mode, an inactive state, or a combination thereof.

Aspect 4: The method of any of Aspects 1 through 3, wherein the reference signal includes at least one of a tracking reference signal, a channel state information reference signal, or a combination thereof.

Aspect 5: The method of any of Aspects 1 through 4, wherein the measurements of the reference signal include a reference signal received power.

Aspect 6: The method of any of Aspects 1 through 5, wherein the random access procedure includes a 2-step random access procedure or a 4-step random access procedure.

Aspect 7: The method of any of Aspects 1 through 6, further comprising: receiving, from the base station, a message including at least one parameter associated with the random access procedure, wherein the random access procedure is initiated based at least in part on the at least one parameter.

Aspect 8: The method of Aspect 7, wherein the message is a system information block message.

Aspect 9: The method of any of Aspects 7 through 8, wherein the at least one parameter includes at least one threshold, and wherein the random access procedure is initiated based at least in part on the measurements, of the reference signal, satisfying the threshold.

Aspect 10: The method of Aspect 9, wherein the at least one threshold is distinct from at least one additional threshold associated with measurements of a synchronization signal.

Aspect 11: The method of Aspect 10, wherein the synchronization signal includes a synchronization signal block.

Aspect 12: The method of any of Aspects 9 through 11, wherein the at least one threshold includes a first threshold associated with a 2-step random access procedure and a second threshold associated with a 4-step random access procedure.

Aspect 13: The method of Aspect 12, further comprising: determining whether to initiate a 2-step random access procedure or a 4-step random access procedure based at least in part on the measurements, the first threshold, and the second threshold.

Aspect 14: The method of any of Aspects 7 through 13, wherein the at least one parameter includes an identifier of one or more resources for the random access procedure initiated by transmitting a random access preamble, and wherein the random access preamble includes the identifier.

Aspect 15: The method of any of Aspects 7 through 14, wherein the at least one parameter includes at least one parameter associated with a transmit power for a random access preamble, and wherein the random access procedure is initiated by transmission of the random access preamble with the transmit power.

Aspect 16: The method of Aspect 15, wherein the at least one parameter, associated with the transmit power for the random access preamble, includes at least one of a target received power, a power ramping parameter, a power control offset, or a combination thereof.

Aspect 17: The method of any of Aspects 7 through 16, wherein the at least one parameter includes a maximum number of transmissions for a random access occasion associated with the random access procedure.

Aspect 18: The method of any of Aspects 1 through 17, further comprising: monitoring a paging occasion, wherein the reference signal is received based at least in part on monitoring the paging occasion; and receiving, from the base station and based at least in part on the monitoring, a paging message for the UE, wherein the random access procedure is initiated based at least in part on receiving the paging message.

Aspect 19: The method of any of Aspects 1 through 18, wherein a random access occasion for initiating the random access procedure is selected based at least in part on the reference signal.

Aspect 20: A method of wireless communication performed by a base station, comprising: transmitting, to a user equipment (UE), a broadcast message including at least one parameter associated with a random access procedure; and transmitting, to the UE, a reference signal for the UE to measure, wherein the random access procedure is based at least in part on measurements of the reference signal.

Aspect 21: The method of Aspect 20, wherein the base station communicates with the UE on a 5G New Radio network.

Aspect 22: The method of any of Aspects 20 through 21, wherein the reference signal is transmitted to the UE when the UE is in an idle mode, an inactive state, or a combination thereof.

Aspect 23: The method of any of Aspects 20 through 22, wherein the reference signal includes at least one of a tracking reference signal, a channel state information reference signal, or a combination thereof.

Aspect 24: The method of any of Aspects 20 through 23, wherein the measurements of the reference signal include a reference signal received power.

Aspect 25: The method of any of Aspects 20 through 24, wherein the random access procedure includes a 2-step random access procedure or a 4-step random access procedure.

Aspect 26: The method of any of Aspects 20 through 25, further comprising: receiving, from the UE, a random access preamble associated with the random access procedure.

Aspect 27: The method of Aspect 26, further comprising: transmitting, to the UE, a paging message for the UE, wherein the random access preamble is received based at least in part on transmitting the paging message.

Aspect 28: The method of any of Aspects 20 through 27, wherein the broadcast message is a system information block message.

Aspect 29: The method of any of Aspects 20 through 28, wherein the at least one parameter includes at least one threshold, and wherein the measurements of the reference signal include a determination of whether the measurements satisfy the at least one threshold.

Aspect 30: The method of Aspect 29, wherein the at least one threshold is distinct from at least one additional threshold associated with measurements of a synchronization signal.

Aspect 31: The method of Aspect 30, wherein the synchronization signal includes a synchronization signal block.

Aspect 32: The method of any of Aspects 29 through 31, wherein the at least one threshold includes a first threshold associated with a 2-step random access procedure and a second threshold associated with a 4-step random access procedure.

Aspect 33: The method of Aspect 32, further comprising: receiving, from the UE, a 2-step random access preamble or a 4-step random access preamble based at least in part on the measurements of the reference signal, the first threshold, and the second threshold.

Aspect 34: The method of any of Aspects 20 through 33, wherein the at least one parameter includes an identifier of one or more resources for the random access procedure.

Aspect 35: The method of any of Aspects 20 through 34, wherein the at least one parameter includes at least one parameter associated with a transmit power for the random access procedure.

Aspect 36: The method of Aspect 35, wherein the at least one parameter, associated with the transmit power for the random access procedure, includes at least one of a target received power, a power ramping parameter, a power control offset, or a combination thereof.

Aspect 37: The method of any of Aspects 20 through 36, wherein the at least one parameter includes a maximum number of transmissions for a random access occasion associated with the random access procedure.

Aspect 38: A method of wireless communication performed by a user equipment (UE), comprising: receiving, from a base station, a signal including at least one parameter associated with a reference signal, wherein the reference signal is not a cell-specific reference signal; and transmitting, to the base station and based at least in part on measurements of the reference signal, a random access preamble with a transmit power based at least in part on the at least one parameter.

Aspect 39: The method of Aspect 38, wherein the UE communicates with the base station on a 5G New Radio network.

Aspect 40: The method of any of Aspects 38 through 39, wherein the reference signal includes at least one of a tracking reference signal, a channel state information reference signal, or a combination thereof.

Aspect 41: The method of any of Aspects 38 through 40, wherein the random access preamble includes a 2-step random access preamble or a 4-step random access preamble.

Aspect 42: The method of any of Aspects 38 through 41, wherein the signal is a broadcast message.

Aspect 43: The method of Aspect 42, wherein the broadcast message is a system information block message.

Aspect 44: The method of any of Aspects 38 through 43, wherein the at least one parameter includes a target received power for the random access preamble.

Aspect 45: The method of Aspect 44, wherein the transmit power is based at least in part on the target received power for the random access preamble.

Aspect 46: The method of any of Aspects 44 through 45, wherein the target received power is distinct from at least one additional target received power associated with a synchronization signal.

Aspect 47: The method of Aspect 46, wherein the synchronization signal includes a synchronization signal block.

Aspect 48: The method of any of Aspects 38 through 47, wherein the at least one parameter includes a power control offset associated with the reference signal.

Aspect 49: The method of Aspect 48, wherein the transmit power is based at least in part on a pathloss estimate, wherein the pathloss estimate is based at least in part on the power control offset.

Aspect 50: The method of any of Aspects 38 through 49, wherein the transmit power is based at least in part on a pathloss estimate, wherein the pathloss estimate is based at least in part on a measurement of the reference signal.

Aspect 51: The method of Aspect 50, wherein the at least one parameter includes one or more weights, and wherein the pathloss estimate is based at least in part on applying the one or more weights to the measurement of the reference signal.

Aspect 52: The method of any of Aspects 38 through 51, further comprising: monitoring a paging occasion; and receiving, from the base station and based at least in part on the monitoring, a paging message for the UE, wherein the random access preamble is transmitted based at least in part on receiving the paging message.

Aspect 53: A method of wireless communication performed by a base station, comprising: transmitting, to a user equipment (UE), a signal including at least one parameter associated with a reference signal, wherein the reference signal is not a cell-specific reference signal; and receiving, from the UE and based at least in part on measurements of the reference signal, a random access preamble with a transmit power based at least in part on the at least one parameter.

Aspect 54: The method of Aspect 53, wherein the base station communicates with the UE on a 5G New Radio network.

Aspect 55: The method of any of Aspects 53 through 54, wherein the reference signal includes at least one of a tracking reference signal, a channel state information reference signal, or a combination thereof.

Aspect 56: The method of any of Aspects 53 through 55, wherein the random access preamble includes a 2-step random access preamble or a 4-step random access preamble.

Aspect 57: The method of any of Aspects 53 through 56, wherein the signal is a broadcast message.

Aspect 58: The method of Aspect 57, wherein the broadcast message is a system information block message.

Aspect 59: The method of any of Aspects 53 through 58, wherein the at least one parameter includes a target received power for the random access preamble.

Aspect 60: The method of Aspect 59, wherein the transmit power is based at least in part on the target received power for the random access preamble.

Aspect 61: The method of any of Aspects 59 through 60, wherein the target received power is distinct from at least one additional target received power associated with a synchronization signal.

Aspect 62: The method of Aspect 61, wherein the synchronization signal includes a synchronization signal block.

Aspect 63: The method of any of Aspects 53 through 62, wherein the at least one parameter includes a power control offset associated with the reference signal.

Aspect 64: The method of Aspect 63, wherein the transmit power is based at least in part on a pathloss estimate, wherein the pathloss estimate is based at least in part on the power control offset.

Aspect 65: The method of any of Aspects 53 through 64, wherein the transmit power is based at least in part on a pathloss estimate, wherein the pathloss estimate is based at least in part on a measurement of the reference signal.

Aspect 66: The method of Aspect 65, wherein the at least one parameter includes one or more weights, and wherein the pathloss estimate is based at least in part on applying the one or more weights to the measurement of the reference signal.

Aspect 67: The method of any of Aspects 53 through 66, further comprising: transmitting, to the UE, a paging message for the UE, wherein the random access preamble is received based at least in part on transmitting the paging message.

Aspect 68: An apparatus for wireless communication at a device, comprising a processor; memory coupled with the processor; and instructions stored in the memory and executable by the processor to cause the apparatus to perform the method of one or more of Aspects 1-19.

Aspect 69: A device for wireless communication, comprising a memory and one or more processors coupled to the memory, the one or more processors configured to perform the method of one or more of Aspects 1-19.

Aspect 70: An apparatus for wireless communication, comprising at least one means for performing the method of one or more of Aspects 1-19.

Aspect 71: A non-transitory computer-readable medium storing code for wireless communication, the code comprising instructions executable by a processor to perform the method of one or more of Aspects 1-19.

Aspect 72: A non-transitory computer-readable medium storing a set of instructions for wireless communication, the set of instructions comprising one or more instructions that, when executed by one or more processors of a device, cause the device to perform the method of one or more of Aspects 1-19.

Aspect 73: An apparatus for wireless communication at a device, comprising a processor; memory coupled with the processor; and instructions stored in the memory and executable by the processor to cause the apparatus to perform the method of one or more of Aspects 20-37.

Aspect 74: A device for wireless communication, comprising a memory and one or more processors coupled to the memory, the one or more processors configured to perform the method of one or more of Aspects 20-37.

Aspect 75: An apparatus for wireless communication, comprising at least one means for performing the method of one or more of Aspects 20-37.

Aspect 76: A non-transitory computer-readable medium storing code for wireless communication, the code comprising instructions executable by a processor to perform the method of one or more of Aspects 20-37.

Aspect 77: A non-transitory computer-readable medium storing a set of instructions for wireless communication, the set of instructions comprising one or more instructions that, when executed by one or more processors of a device, cause the device to perform the method of one or more of Aspects 20-37.

Aspect 78: An apparatus for wireless communication at a device, comprising a processor; memory coupled with the processor; and instructions stored in the memory and executable by the processor to cause the apparatus to perform the method of one or more of Aspects 38-52.

Aspect 79: A device for wireless communication, comprising a memory and one or more processors coupled to the memory, the one or more processors configured to perform the method of one or more of Aspects 38-52.

Aspect 80: An apparatus for wireless communication, comprising at least one means for performing the method of one or more of Aspects 38-52.

Aspect 81: A non-transitory computer-readable medium storing code for wireless communication, the code comprising instructions executable by a processor to perform the method of one or more of Aspects 38-52.

Aspect 82: A non-transitory computer-readable medium storing a set of instructions for wireless communication, the set of instructions comprising one or more instructions that, when executed by one or more processors of a device, cause the device to perform the method of one or more of Aspects 38-52.

Aspect 83: An apparatus for wireless communication at a device, comprising a processor; memory coupled with the processor; and instructions stored in the memory and executable by the processor to cause the apparatus to perform the method of one or more of Aspects 53-67.

Aspect 84: A device for wireless communication, comprising a memory and one or more processors coupled to the memory, the one or more processors configured to perform the method of one or more of Aspects 53-67.

Aspect 85: An apparatus for wireless communication, comprising at least one means for performing the method of one or more of Aspects 53-67.

Aspect 86: A non-transitory computer-readable medium storing code for wireless communication, the code comprising instructions executable by a processor to perform the method of one or more of Aspects 53-67.

Aspect 87: A non-transitory computer-readable medium storing a set of instructions for wireless communication, the set of instructions comprising one or more instructions that, when executed by one or more processors of a device, cause the device to perform the method of one or more of Aspects 53-67.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, wherein the one or more processors are configured to:
      receive, while the UE is in a low-power mode, a reference signal from a network entity, wherein the reference signal includes at least one of a tracking reference signal (TRS) or a channel state information reference signal (CSI-RS);
      measure the reference signal;
      receive a first paging message, wherein a first delay between the measurement of the reference signal and the receipt of the first paging message is less than a second delay between a measurement of a synchronization signal and a receipt of a second paging message; and
      initiate a random access procedure based at least in part on the first paging message.

2. The UE of claim 1, wherein the UE communicates with the network entity on a 5G New Radio network.

3. The UE of claim 1, wherein the low-power mode is associated with an idle mode, an inactive state, or a combination thereof.

4. The UE of claim 1, wherein the one or more processors are further configured to:
receive, from the network entity, a message including at least one parameter associated with the random access procedure,
wherein the random access procedure is initiated based at least in part on the at least one parameter.

5. The UE of claim 4, wherein the at least one parameter includes at least one threshold, and wherein the random access procedure is initiated based at least in part on the measurement, of the reference signal, satisfying the threshold.

6. The UE of claim 5, wherein the at least one threshold is distinct from at least one additional threshold associated with the measurement of the synchronization signal.

7. The UE of claim 5, wherein the at least one threshold includes a first threshold associated with a 2-step random access procedure and a second threshold associated with a 4-step random access procedure.

8. The UE of claim 7, wherein the one or more processors are further configured to:
determine whether to initiate a 2-step random access procedure or a 4-step random access procedure based at least in part on the measurement of the reference signal, the first threshold, and the second threshold.

9. The UE of claim 4, wherein the at least one parameter includes at least one parameter associated with a transmit power for a random access preamble; and
wherein the one or more processors, to initiate the random access procedure, are configured to:
initiate the random access procedure by transmission of the random access preamble with the transmit power.

10. The UE of claim 9, wherein the at least one parameter, associated with the transmit power for the random access preamble, includes at least one of a target received power, a power ramping parameter, or a power control offset.

11. The UE of claim 1, wherein the one or more processors are further configured to:
monitor a paging occasion;
wherein the one or more processors, to receive the reference signal, are configured to:
receive the reference signal based at least in part on the paging occasion being monitored; and
wherein the one or more processors, to receive the first paging message, are configured to:
receive, from the network entity and based at least in part on the paging occasion being monitored, the first paging message.

12. The UE of claim 1, wherein the reference signal is configured to be received with greater frequency than the synchronization signal.

13. A network entity for wireless communication, comprising:
a memory; and
one or more processors coupled to the memory, wherein the one or more processors are configured to:
transmit, to a user equipment (UE), a broadcast message including at least one parameter associated with a random access procedure;
transmit, to the UE, a reference signal for the UE to measure,
wherein the reference signal includes at least one of a tracking reference signal (TRS) or a channel state information reference signal (CSI-RS); and
transmit, to the UE, a first paging message,
wherein a first delay between a measurement of the reference signal and the transmission of the first paging message is less than a second delay between a measurement of a synchronization signal and a transmission of a second paging message, and
wherein the random access procedure is based at least in part on the first paging message.

14. The network entity of claim 13, wherein the one or more processors are further configured to:
receive, from the UE, a random access preamble based at least in part on the transmission of the first paging message.

15. The network entity of claim 13, wherein the reference signal is configured to be transmitted with greater frequency than the synchronization signal.

16. A user equipment (UE) for wireless communication, comprising:
a memory; and
one or more processors coupled to the memory, wherein the one or more processors are configured to:
receive, from a network entity, a signal including at least one parameter associated with a reference signal, wherein the reference signal includes at least one of a tracking reference signal (TRS) or a channel state information reference signal (CSI-RS);
measure the reference signal;
receive a first paging message, wherein a first delay between the measurement of the reference signal and the receipt of the first paging message is less than a second delay between a measurement of a synchronization signal and a receipt of a second paging message; and
transmit, to the network entity and based at least in part on the first paging message, a random access preamble with a transmit power based at least in part on the at least one parameter.

17. The UE of claim 16, wherein the UE communicates with the network entity on a 5G New Radio network.

18. The UE of claim 16, wherein the random access preamble includes a 2-step random access preamble or a 4-step random access preamble.

19. The UE of claim 16, wherein the signal is a system information block message.

20. The UE of claim 16, wherein the at least one parameter includes a target received power associated with the random access preamble.

21. The UE of claim 20, wherein the transmit power is based at least in part on the target received power associated with the random access preamble.

22. The UE of claim 20, wherein the target received power is distinct from at least one additional target received power associated with a synchronization signal.

23. The UE of claim 16, wherein the at least one parameter includes a power control offset associated with the reference signal.

24. The UE of claim 23, wherein the transmit power is based at least in part on a pathloss estimate, wherein the pathloss estimate is based at least in part on the power control offset.

25. The UE of claim 16, wherein the transmit power is based at least in part on a pathloss estimate, wherein the pathloss estimate is based at least in part on the measurement of the reference signal.

26. The UE of claim 25, wherein the at least one parameter includes one or more weights, and wherein the pathloss estimate is based at least in part on an application of the one or more weights to the measurement of the reference signal.

27. The UE of claim 16, wherein the one or more processors are further configured to:
monitor a paging occasion; and
wherein the one or more processors, to receive the first paging message, are configured to:
receive, from the network entity and based at least in part on the paging occasion being monitored, the first paging message for the UE.

28. The UE of claim 16, wherein the reference signal is configured to be received with greater frequency than the synchronization signal.

29. A network entity for wireless communication, comprising:
a memory; and
one or more processors coupled to the memory, wherein the one or more processors are configured to:
transmit, to a user equipment (UE), a signal including at least one parameter associated with a reference signal, wherein the reference signal includes at least one of a tracking reference signal (TRS) or a channel state information reference signal (CSI-RS);
transmit, to the UE, a first paging message,
wherein a first delay between a measurement of the reference signal and the transmission of the first paging message is less than a second delay between a measurement of a synchronization signal and a transmission of a second paging message; and
receive, from the UE and based at least in part on the first paging message, a random access preamble with a transmit power based at least in part on the at least one parameter.

30. The network entity of claim 29, wherein the at least one parameter includes a target received power associated with the random access preamble that is distinct from at least one additional target received power associated with a synchronization signal.

\* \* \* \* \*